United States Patent
Ishikawa et al.

(10) Patent No.: US 6,721,148 B2
(45) Date of Patent: Apr. 13, 2004

(54) MAGNETORESISTIVE SENSOR, THIN-FILM READ/WRITE HEAD, AND MAGNETIC RECORDING APPARATUS USING THE SENSOR

(75) Inventors: Chiaki Ishikawa, Kokubunji (JP); Yoshio Suzuki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 74 days.

(21) Appl. No.: 10/198,349

(22) Filed: Jul. 19, 2002

(65) Prior Publication Data
US 2003/0161080 A1 Aug. 28, 2003

(30) Foreign Application Priority Data
Feb. 26, 2002 (JP) ........................ 2002-048942

(51) Int. Cl.$^7$ ................................. G11B 5/39
(52) U.S. Cl. ................................. 360/324.12
(58) Field of Search .............. 360/324.12, 324.11, 360/324.2, 322, 327, 327.1, 327.2, 327.3

(56) References Cited

U.S. PATENT DOCUMENTS

| | | | | |
|---|---|---|---|---|
| 5,492,720 A | * | 2/1996 | Gill et al. | 427/131 |
| 5,600,518 A | * | 2/1997 | Koga | 360/327 |
| 5,608,593 A | * | 3/1997 | Kim et al. | 360/324.12 |
| 5,753,131 A | * | 5/1998 | Choukh et al. | 216/22 |
| 6,385,018 B1 | * | 5/2002 | Mukoyama | 360/324.12 |
| 6,433,973 B1 | * | 8/2002 | Li et al. | 360/324.11 |
| 6,507,465 B1 | * | 1/2003 | Nakamoto et al. | 360/322 |

FOREIGN PATENT DOCUMENTS

JP 4-103014 4/1992

OTHER PUBLICATIONS

Physical Review B, vol. 43, pp. 1297–1300, "Gian Magnetoresistive Effect in Soft Magnetic Multi–layered Film".

* cited by examiner

*Primary Examiner*—A. J. Heinz
*Assistant Examiner*—Angel Castro
(74) *Attorney, Agent, or Firm*—Mattingly, Stanger & Malur, P.C.

(57) ABSTRACT

A magnetoresistive head has a magnetoresistive element including an antiferromagnetic layer, a second magnetic layer on the antiferromagnetic layer, a non-magnetic interlayer on the second magnetic layer, and a first magnetic layer on the non-magnetic interlayer. The first magnetic layer has at least one region at an end thereof which has a smaller saturation magnetization than the central part of the first magnetic layer. The end region has a width Xe (in the track width direction) defined by $0.08 \leq Xe/Twr \leq 0.2$, where Twr denotes the track width. The magnetoresistive element is held between an upper shield and a lower shield. The effect of this construction is that the end regions of the first magnetic layer are more affected by the longitudinal bias field than the central part of the first magnetic layer. Consequently, the occurrence of magnetic domains is efficiently suppressed in the end regions of the first magnetic layer.

12 Claims, 19 Drawing Sheets

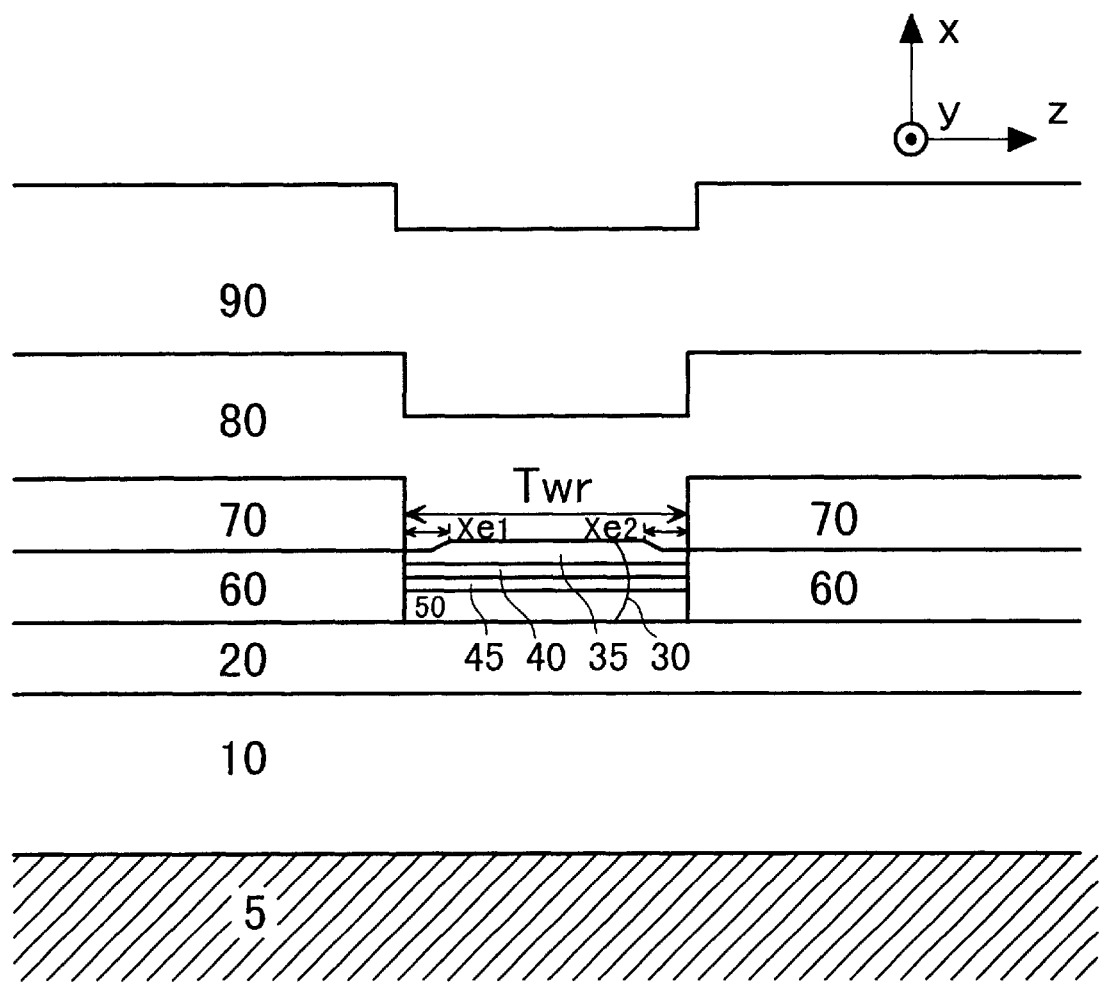

FIG.7A
(1) 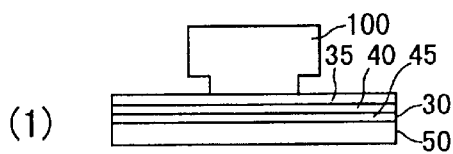
(2) 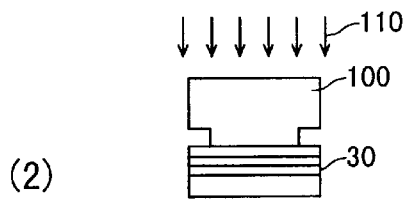
(3) 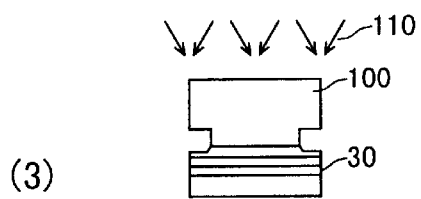
(4) 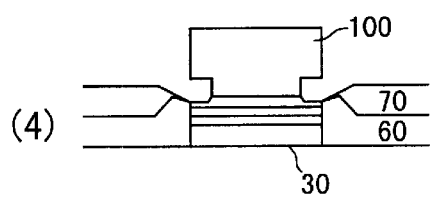
(5) 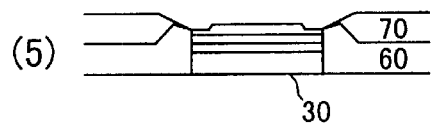
FIG.7B
(1) 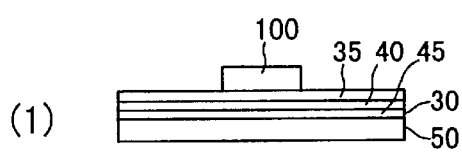
(2) 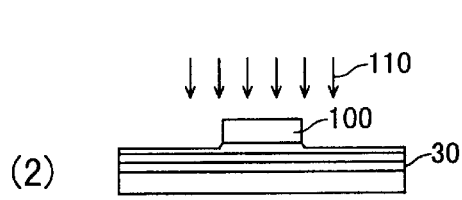
(3) 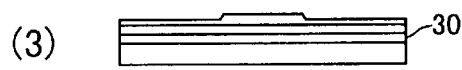
(4) 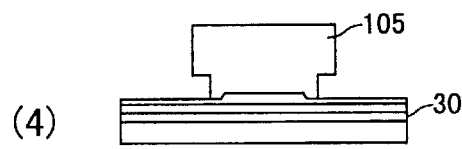
(5) 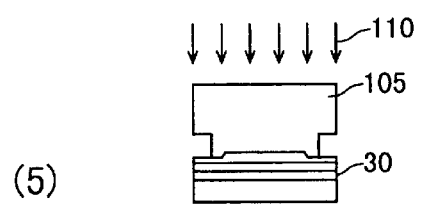
(6) 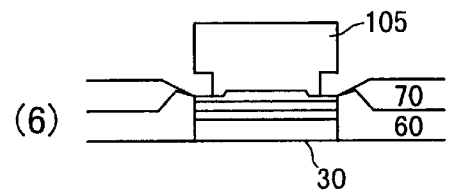
(7) 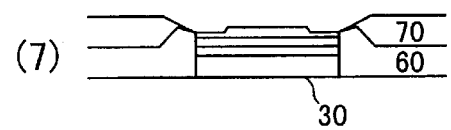

MAGNETORESISTIVE SENSOR, THIN-FILM READ/WRITE HEAD, AND MAGNETIC RECORDING APPARATUS USING THE SENSOR

BACKGROUND OF THE INVENTION

1. Field of the Invention

The present invention relates generally to magnetoresistive devices, and more particularly to magnetoresistive sensors and heads that include a magnetoresistive element having an antiferromagnetic layer and two magnetic layers sandwiching a non-magnetic interlayer, as well as to a process for producing the magnetoresistive element.

2. Description of the Related Art

Recent magnetic disks capable of high-density recording require a highly sensitive read head. One example of such a highly sensitive read head in disclosed in *Physical Review B*, Vol. 43, pp. 1297–1300, "Giant Magnetoresistance Effect in Soft Magnetic Multi-layered Film", which shows a structure having two magnetic layers separated by a non-magnetic metal layer, and in which one of the magnetic layers receives an exchange bias magnetic field from an antiferromagnetic layer.

The above-mentioned thesis points out that resistance (R) in the multi-layered film has a component which changes in proportion to cos θ, where θ represents the angle between the directions of magnetization of the two magnetic layers. This phenomenon is referred to as the giant magnetoresistance effect (GMR) or spin valve effect.

The giant magnetoresistive head works in different modes depending on whether a sense current flows along or across the layer plane (referred to as "current in the plane" or CIP mode and "current perpendicular to the plane" or CPP mode, respectively). The MR ratio in CPP mode is more than twice as high as that in CIP mode at room temperature.

Among highly sensitive read heads is a tunnel magnetoresistive (TMR) head, which has attracted attention in recent years. The TMR head utilizes a ferromagnetic tunnel junction due to a tunnel barrier layer held between two ferromagnetic layers. Its structure is disclosed in Japanese Laid-open Patent No. 103014/1992. The structure is quite similar to that of a giant magnetoresistive head in CPP mode, the only difference being the tunnel barrier layer acting as an insulating layer which replaces the non-magnetic metal layer in the giant magnetoresistive head.

The conventional giant magnetoresistive head in CIP mode has a magnetoresistive film (GMR film) 30 which is composed of a free layer 35, a non-magnetic metal layer (Cu layer) 40, a pinned layer 45, and an antiferromagnetic layer 50, which are formed one on top of another as shown in FIG. 16. The magnetization of the pinned layer 45 is pinned in the direction of element height by the exchange bias magnetic field from the antiferromagnetic layer 50. In general, the axis of easy magnetization of the free layer 35 is made parallel to the direction of the track width of the head.

The giant magnetoresistive head in CIP mode is produced by a process which consists of a first step of sequentially forming a magnetic shield layer 10, a magnetic gap layer 20, and a magnetoresistive (GMR) film 30 on a substrate 5, a second step of arranging permanent magnets 60 and electrode films 70 at both ends of the GMR film 30, and a third step of forming a magnetic gap layer 80, with a magnetic shield film 90 interposed thereunder.

The giant magnetoresistive head in CPP mode also has a magnetoresistive (GMR) film 30 which is composed of a free layer 35, a Cu layer 40, a pinned layer 45, and an antiferromagnetic layer 50, which are formed one on top of another as shown in FIG. 17. The magnetization of the pinned layer 45 is pinned in the direction of element height by the exchange bias magnetic field from the antiferromagnetic layer 50. The axis of easy magnetization of the free layer 35 is made parallel to the direction of the track width of the head.

The giant magnetoresistive head in CPP mode is produced by a process which consists of a first step of sequentially forming a magnetic shield layer 10 (which functions also as a lower electrode film) and a magnetoresistive (GMR) film 30 on a substrate 5, a second step of patterning the GMR film 30, a third step of arranging permanent magnets 60 at both ends of the GMR film 30, a fourth step of arranging insulating films 65 of $Al_2O_3$ such that they cover the permanent magnets 60, and a fifth step of forming an upper shield layer 90 which functions also as an upper electrode film. The insulating films prevent current from flowing into the permanent magnet.

The tunnel magnetoresistive head is quite similar in structure to the above-described giant magnetoresistive head in CPP mode. The only difference between them is replacement of the magnetoresistive film 30 by the tunnel magnetoresistive film 31 which is composed of a free layer 35, a tunnel barrier layer 41, a pinned layer 45, and an antiferromagnetic layer 50 as shown in FIG. 18.

Both the giant magnetoresistive film and the tunnel magnetoresistive film (collectively referred to as "magnetoresistive film") have permanent magnet films arranged at both sides thereof. The permanent magnet film applies a longitudinal bias field in the direction of track width to the magnetoresistive film so as to reduce Barkhausen noise attributable to the magnetic domain structure in the free layer. The longitudinal bias field applied by the permanent magnet film is distributed as shown in FIG. 19, which shows weakness at the center of the magnetoresistive element (due to the effect of the shield film) and an increase far from the center through which the track width extends.

The magnetic domain structure, which causes noise in the free layer, tends to occur at both ends in the track width direction where there is a strong self-demagnetizing field. Therefore, it is desirable to apply a stronger longitudinal bias field to both ends of the free layer in the track width direction.

The ever-increasing recording density in magnetic recording requires the magnetic head to have a narrower track width and a higher reproducing sensitivity.

The result of reducing the track width of the magnetic head is a decrease in the distance between the permanent magnets arranged at both ends of the magnetoresistive element. Decreasing this distance means that the area receiving the strong longitudinal bias field in the free layer increases relative to the track width. In other words, the longitudinal bias field, which is applied to the center of the free layer through which the track width extends, increases with the decreasing track width of the magnetic head.

On the other hand, the increasing longitudinal bias field causes the rotation magnetization of the free layer to decrease due to the signal magnetic field at the center of the free layer through which the track width extends. This leads to a decrease in reproducing sensitivity. Therefore, it is desirable to apply as small a longitudinal bias field as possible to the center of the track of the free layer, so as to secure good sensitivity.

One possible way to improve the reproducing sensitivity is to reduce the thickness of the permanent magnet film, thereby decreasing the longitudinal bias field applied to the center of the free layer through which the track width extends. However, the reduction in thickness of the permanent magnet film results in insufficient longitudinal bias field at the ends of the free layer, which leads to the occurrence of magnetic domains, which in turn produces Barkhausen noise.

The foregoing presents difficulties in achieving both improvement in reproducing sensitivity and reduction in Barkhausen noise if the magnetic head has a narrow track.

SUMMARY OF THE INVENTION

The present invention was completed in view of the foregoing. Thus, one of the objects of the present invention is to provide a magnetoresistive element, a magnetoresistive head provided therewith, or a process for production thereof, with a high reproducing sensitivity of low Barkhausen noise even though the track width is very narrow. Furthermore, another one of the objects of the invention is to provide a magnetic recording apparatus equipped with the magnetoresistive head that may be combined with a magnetic recording medium for high-density recording.

One of the features of the present invention is in the structure of the magnetoresistive element utilized by the magnetoresistive head, which comprises an antiferromagnetic layer, a second magnetic layer, a non-magnetic interlayer, and a first magnetic layer which are stacked on one another, and a specific region with predetermined length provided at an end of the first magnetic layer in the track width direction. In the specific region, the thickness of the first magnetic layer is thinner than that of its central part.

At both ends of the first magnetic layer in the track width direction, there is a tendency for a specific magnetic domain structure that causes noise to be easily generated, due to the large self-demagnetizing field. The longitudinal bias field necessary to suppress magnetic domains in the first magnetic layer varies depending on the product of the saturation magnetization and the thickness of the first magnetic layer ("amount of magnetization"). In other words, the smaller this product becomes, the smaller the required longitudinal bias field becomes.

For this reason, the first magnetic layer is formed such that regions at both ends are thinner than at its central part, so that the effect of the longitudinal bias field can be increased at the end regions rather than at the center of the first magnetic layer. By this structure, the occurrence of magnetic domains at the end regions of the first magnetic layer can be efficiently controlled, without increasing the longitudinal bias field to be applied to the first magnetic layer.

Another way of decreasing the amount of magnetization at the end of the first magnetic layer is to reduce the saturation magnetization instead of the film thickness. Therefore, one aspect of a magnetic head to which the present invention is applied is in the structure of the magnetoresistive element that comprises an antiferromagnetic layer, a second magnetic layer, a non-magnetic interlayer, and a first magnetic layer which are stacked on one another, and with a specific region with a predetermined length provided at an end of the first magnetic layer in the track width direction. In each specific region, the saturation magnetization of the first magnetic layer is smaller than that at its central part.

Thus, the first magnetic layer is formed such that regions at both ends have smaller saturation magnetizations than its central part, to increase the effect of the longitudinal bias field at the end regions relative to the central part. By this structure, the occurrence of magnetic domains at the end regions of the first magnetic layer can be efficiently controlled without increasing the longitudinal bias field to be applied to the first magnetic layer.

These and other objects, features, and advantages of the invention will be set forth more fully in the following description.

BRIEF DESCRIPTION OF THE DRAWINGS

FIG. 5 is a sectional view of a magnetoresistive head in CIP mode;

FIG. 7 is a diagram showing the process for producing a giant magnetoresistive film constructed according to the teachings of the present invention;

DETAILED DESCRIPTION OF THE PREFERRED EMBODIMENTS

Figure 1A:
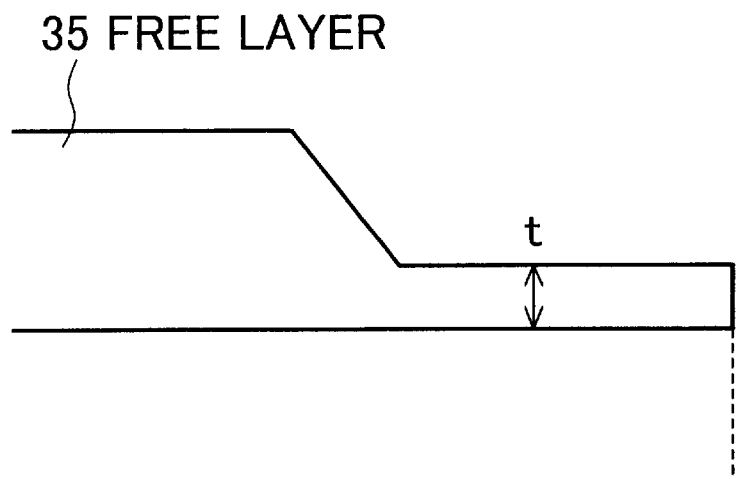
FIG. 1 is a schematic diagram showing the shape of an end region of a free layer in a magnetoresistive film constructed according to the teachings of the present invention.

In the following, magnetoresistive heads constructed according to the teachings of the present invention will be described in detail.

A magnetoresistive head in CIP mode includes a substrate, a lower shield film (NiFe), an insulating film ($Al_2O_3$) for forming a magnetic gap, and a giant magnetoresistive (GMR) film, which are sequentially formed one on top of another.

At both ends of the GMR film (through which the track width extends) are arranged permanent magnet films (CoCrPt) with a residual magnetic flux density of 0.7 T. These permanent magnet films apply a longitudinal bias field to the free layer so as to control the occurrence of magnetic domains.

The track width is parallel to the plane of the recording medium and is perpendicular to the direction in which the magnetic head moves relative to the recording medium.

The permanent magnet film has an electrode formed thereon. This electrode is composed of Nb/Au/Nb and supplies current to the magnetoresistive film. On the GMR film and electrode are sequentially formed an insulating film ($Al_2O_3$) for forming a magnetic gap, and an upper shield film (NiFe).

The magnetoresistive film (GMR film) is composed of an antiferromagnetic layer, a second magnetic layer (referred to as a pinned layer hereinafter), a non-magnetic interlayer, and a first magnetic layer (referred to as a free layer hereinafter), which are sequentially formed one on top of another. The pinned layer is a magnetic layer in which the direction of magnetization is pinned by the antiferromagnetic layer. The free layer is a magnetic layer in which the direction of magnetization changes under the influence of a signal magnetic field from the recording medium.

According to the first embodiment of the present invention, the magnetoresistive film is characterized by having a free layer which is formed as follows. The free layer has regions at both ends thereof through which the track width extends, which are thinner than its central part through which the track width extends. Each such region has a width Xe (measured in the direction of the track width) which is defined by the following equation:

$$0.08 \leq Xe/Twr \leq 0.2$$

where Twr denotes the track width.

In general, regions at both ends of the free layer are subject to a strong self-demagnetizing magnetic field which forms the magnetic domain structure causing noise. It is necessary to apply a longitudinal bias field in order to suppress the magnetic domain structure in the free layer. The magnitude of the longitudinal bias field varies depending on the product of the saturation magnetization and the thickness of the free layer.

For this reason, the present invention requires the free layer to have regions at both ends which are thinner than its central part, each such region having a width Xe which is defined as above. The free layer meeting this requirement experiences the longitudinal bias field more strongly at its end regions than at its central part. In this way, it is possible to efficiently control the occurrence of magnetic domains at the end regions of the free layer without increasing the longitudinal bias field applied to the central part of the free layer.

Figure 1B:
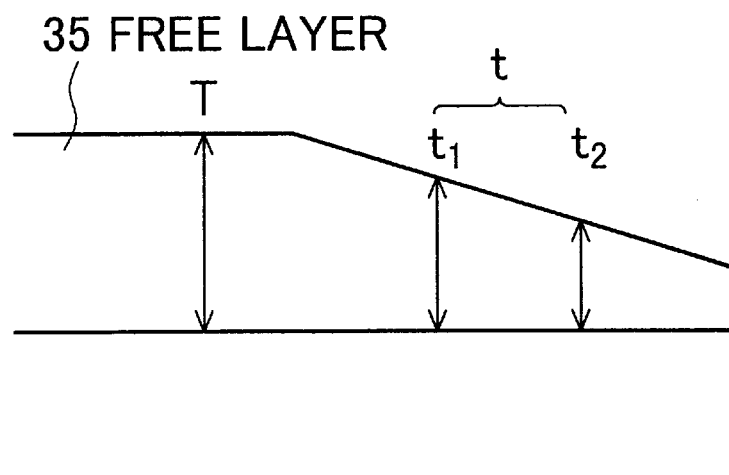
Figure 2B:
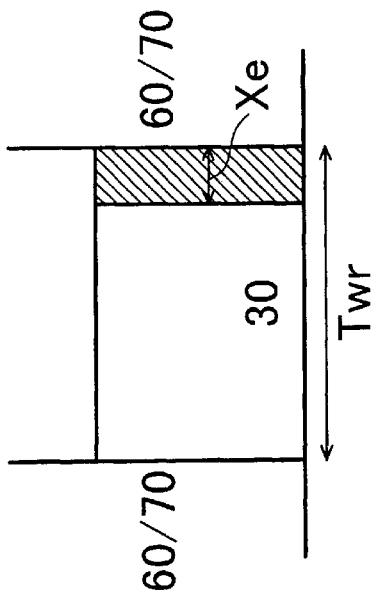
FIG. 2 is a schematic diagram showing he y-z plane of a magnetoresistive film constructed according to the teachings of the present invention.
Figure 2D:
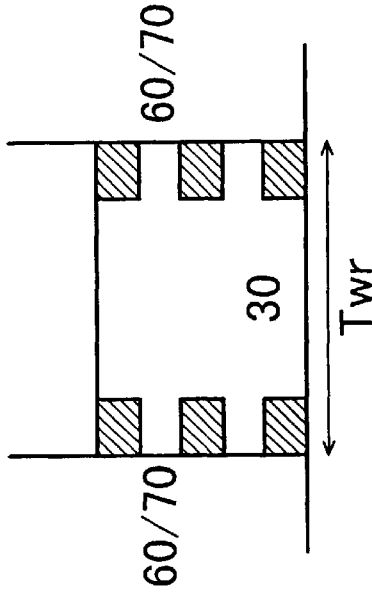
Figure 2A:
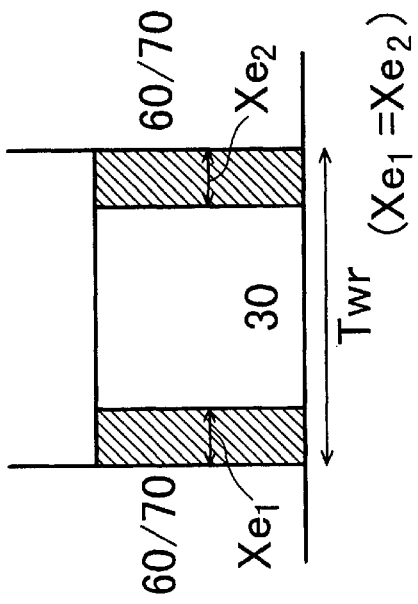
Figure 2C:
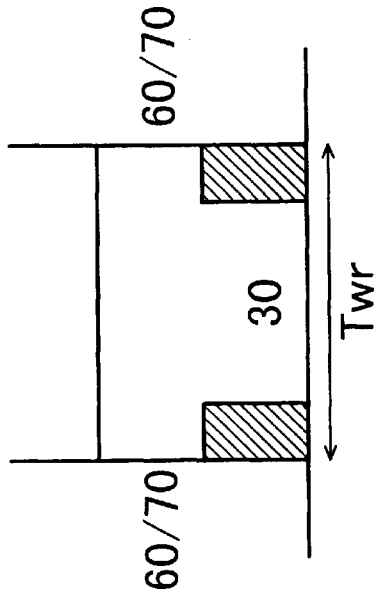

The free layer may have its end regions as shown in FIG. 1($a$) or 1($b$). The end region shown in FIG. 1($a$) has a uniform thickness, while the end region shown in FIG. 1($b$) has a gradually decreasing thickness. Other transitional shapes between these two regions are contemplated, including (for example) a sharper, right-angle transition, so long as they fulfill the requirements of the end region of the disclosed embodiments.

The magnetoresistive film has three axes defined as follows: The z axis is the direction in which the track width extends, the y axis is the direction perpendicular to the z axis in the plane of the magnetoresistive film, and the x axis is the direction in which the layers constituting the magnetoresistive are formed on top of one another.

The end regions which are thinner than the central part may be formed as shown in FIG. 2($a$), which is a schematic plan view of the y-z plane of the magnetoresistive film. It is to be noted that the end regions have a width of $Xe_1$ and $Xe_2$, respectively, and have a length equal to the height of the magnetoresistive element.

The free layer may have only one end region at either end as shown in FIG. 2($b$). This end region has a width of Xe and a length equal to the height of the magnetoresistive element. In this case, the free layer experiences the longitudinal bias field more strongly at the end region than at the central part. This suppresses the occurrence of magnetic domains in the end region of the free layer.

The end regions of the free layer may also be formed as shown in FIG. 2($c$). In this case, the end regions have a width of $Xe_1$ and $Xe_2$, respectively, and have a length equal to half the height of the magnetoresistive element. Moreover, each end region may be divided into two or more sections as shown in FIG. 2($d$). In this case, the end regions have widths of $Xe_1$ and $Xe_2$, respectively, and have appropriately selected individual lengths. Other configurations of end regions (such as divided sections on only one side, for example) are also possible within the scope of the invention.

The end regions shown in FIG. 2 have equal lengths ($Xe_1=Xe_2$). However, $Xe_1$ may be larger or smaller than $Xe_2$ so long as the requirements for $0.08 \leq Xe_1/Twr \leq 0.2$ and $0.08 \leq Xe_2/Twr \leq 0.2$ are met.

The height of the element is defined as the length of the magnetoresistive film 30 measured in the z-axis direction or in the direction perpendicular to the track width in the plane of the magnetoresistive film 30. The height of the element will be referred to as hMR hereinafter.

According to the second embodiment of the present invention, the magnetoresistive film is characterized by its free layer, which is formed as follows. The free layer has regions at both ends (through which the track width extends) which have smaller saturation magnetizations than its central part (through which the track width extends). Each of these regions has a width Xe measured in the direction of the track width, which is defined by the equation $0.08 \leq Xe/Twr \leq 0.2$, as above.

The free layer meeting this requirement experiences the longitudinal bias field more strongly at its end regions than at its central part. In this way, it is possible to efficiently control the occurrence of magnetic domains at the end regions of the free layer without increasing the longitudinal bias field applied to the central part of the free layer.

The saturation magnetization of the free layer region having the width Xe is controlled by a ferromagnetic film formed thereon with an interposed film. This interposed film ferromagnetically couples the ferromagnetic film and the free layer region. Alternatively, the free layer may be formed from different materials, one for the region of width Xe and another for the central part, so that the region of width Xe differs in saturation magnetization from the central part. Furthermore, the free layer may be formed such that a material whose saturation magnetization is smaller than that of the central part is embedded in the end region, which is thinner than the central part.

In the magnetoresistive film according to both the first and second embodiments discussed above, the value of Xe should be properly selected according to the value of Twr. The value of Xe should preferably be from 16 nm to 40 nm if the value of Twr is 0.2 μm, and the value of Xe should preferable be from 4 nm to 20 nm if the value of Twr is smaller than 0.1 μm, for example.

If the ratio of Xe/Twr is smaller than 0.08, the reproducing sensitivity of the resulting magnetoresistive film is not considered to be sufficiently improved. On the other hand, if the ratio of Xe/Twr is larger than 0.2, the resulting magnetoresistive film has a read output waveform whose peak asymmetry exceeds 10% (the peak asymmetry of the read waveform is defined as $|V_- - V_+|/|V_+ + V_+|$, where $V_-$ is the peak value of the positive output and $V_-$ is the peak value of the negative output). The peak asymmetry of the read waveform should preferably be as small as possible, and smaller than 10%.

Any of the magnetoresistive films discussed above should meet the following requirement:

$$0.4 < M_s' \cdot t / M_s \cdot T < 1$$

where T denotes the thickness of the free layer at its central part, $M_s$ denotes the saturation magnetization of the free layer in the central part (of thickness T), t denotes the thickness of the end region which is thinner than the central part, and $M_s'$ denotes the saturation magnetization of the free layer in the end region (of thickness t).

Alternatively, the magnetoresistive film should meet the following requirement:

$$0.4 < M_s' \cdot t / M_s \cdot T < 1$$

where $M_s$ denotes the saturation magnetization of the free layer in the central part, T denotes the thickness of the free layer at its central part (of saturation magnetization Ms), $M_s'$ denotes the saturation magnetization of the free layer in the end region in which the saturation magnetization is smaller than in its central part, and t denotes the thickness of the end region (of saturation magnetization $M_s'$).

Satisfying the above-mentioned equations makes the peak asymmetry of the read output waveform smaller than 10%. With $M_s' \cdot t / M_s \cdot T < 1$, the effective length of the free layer in the track width direction is smaller than the geometrical width of the free layer. In other words, the element has an effectively large aspect ratio (the ratio of the length in the depthwise direction to the length in the track width direction). This leads to a decreased self-demagnetizing field in the depthwise direction of the free layer, which in turn offers the advantage that the magnetization in the free layer readily rotates in response to the signal magnetic field and the reproducing sensitivity improves further.

The magnetoresistive film according to the first and second embodiments mentioned above has the advantage that the end regions of the free layer assume the single domain structure even when the longitudinal bias field applied to the free layer is small enough not to prevent magnetization reversal at the central part of the free layer.

Consequently, the magnetic head provided with the magnetoresistive film discussed above has a high reproducing sensitivity and is free of Barkhausen noise. In addition, the magnetic head according to the present invention has a high reproducing sensitivity and is free of Barkhausen noise, even when the track width is reduced (and hence the distance between the permanent magnets is reduced) or the value of Twr is reduced to 0.05–0.1 μm.

Figure 3:
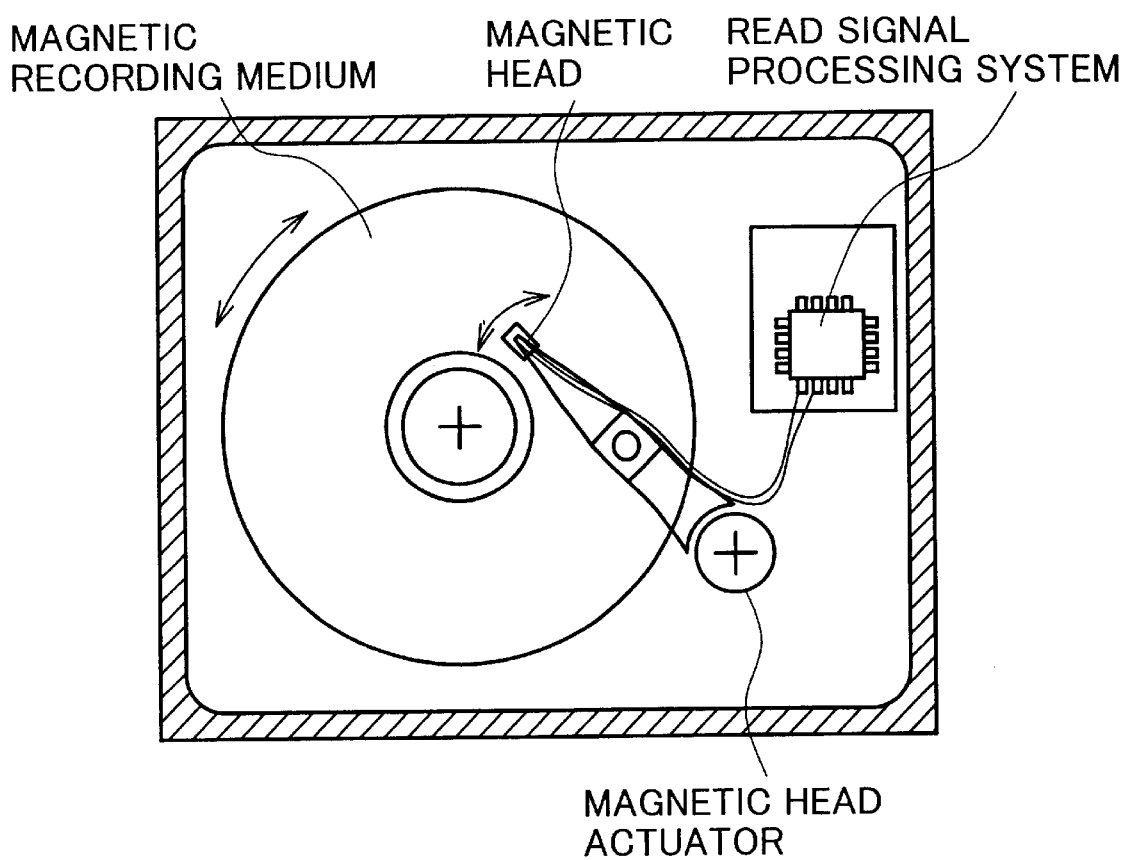
FIG. 3 is a schematic diagram showing a magnetic recording apparatus constructed according to the teachings of the present invention.

The magnetic recording apparatus equipped with the magnetoresistive head discussed above is shown in FIG. 3. The apparatus includes a magnetic recording medium 1, a magnetic head 2, an actuator 3 to actuate the magnetic head 2, and a read signal processing system to process signals reproduced by the magnetic head 2 from the magnetic recording medium 1.

Figure 4:
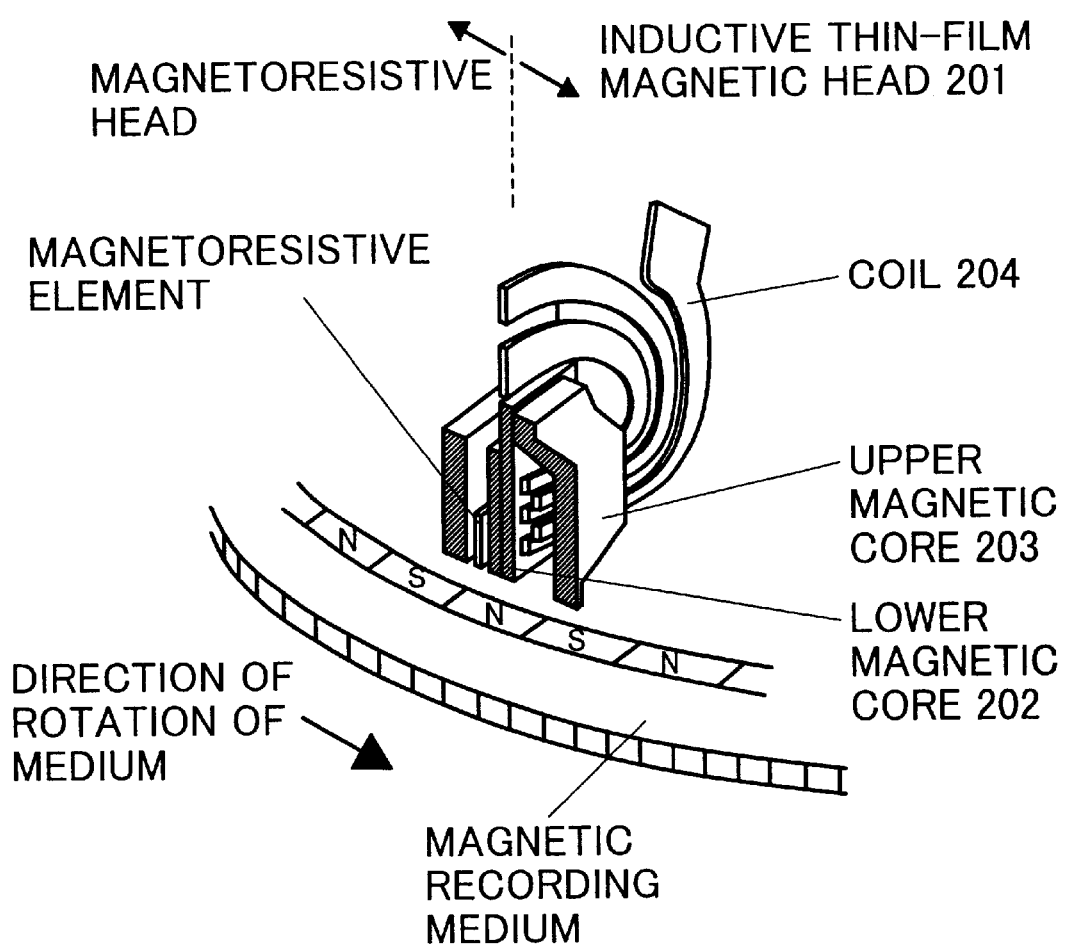
FIG. 4 is a schematic diagram showing a magnetic head constructed according to the teachings of the present invention.

The magnetoresistive head may be integrated with an inductive thin-film magnetic head. As shown in FIG. 4, the inductive thin-film magnetic head 201 has a lower magnetic core 202, an upper magnetic core 203 (facing the lower magnetic core 202), and a coil 204 held between the upper magnetic core 203 and the lower magnetic core 202.

The magnetic recording apparatus discussed above is equipped with a magnetic head having the magnetoresistive element of the invention, and hence is capable of high-density recording. Thus, even when used in combination with a magnetic recording medium with a narrow track width, the apparatus produces a high read output with very little Barkhausen noise. For example, a GMR head in CIP mode or a TMR head according to the invention can be used with a magnetic recording medium having a recording density higher than about 100 Gb/in$^2$, and a GMR head in CPP mode according to the invention can be used with a magnetic recording medium having a recording density higher than 150 Gb/in$^2$.

EXAMPLES

Examples of magnetoresistive heads constructed according to the concepts of the present invention are described below, together with corresponding experimental results.

Example 1

This example demonstrates a magnetic head with a giant magnetoresistive element in CIP mode, which is composed of a substrate 5, a lower shield film (NiFe) 10, an insulating film (Al$_2$O$_3$) 20 for forming a magnetic gap, and a GMR film 30, as shown in FIG. 5.

The GMR film 30 was formed as follows, according to the process shown in FIGS. 6(a) and FIG. 7(a).

The first step (a1) is to sequentially deposit an antiferromagnetic layer (PtMn film) 50, a pinned layer (Co/Ru/Co laminate film) 45, a non-magnetic interlayer (Cu film) 40, and a free layer (NiFe/CoFe laminate film) 35, one on top of another as shown.

The second step (a2) is to form an organic resist film 100 and perform ion milling to pattern the GMR film 30 such that the GMR film 30 has a width (Twr) of 0.2 μm in the direction of the track width.

The third step (a3) is to perform ion milling at different incident angles on the end regions of the free layer such that the end regions of the free layer become thinner than the central part of the free layer. The thinner end regions each have a length Xe of 0.034 μm, so that the requirement of 0.1<Xe/Twr<0.2 is met. The thickness of the central part of the free layer is 4 nm and the thickness of each of the end regions of the free layer is 1.8 nm.

Ion milling is a process for forming a thin film by sputtering, which is performed by accelerating ions so that they impinge upon a sample surface, thereby driving out sample atoms from the sample surface. In this example, ion milling to remove the end parts of the free layer is carried out at an argon pressure of 0.5 mTorr and an accelerating voltage of 500 V. The cross section of the magnetic head (as shown in FIG. 5) can be observed in detail with a TEM (transmission electron microscope).

The fourth step (a4) is to form a permanent magnet film (CoCrPt film) 60 which is contiguous to both ends of the GMR film discussed above. This permanent magnet film 60 is 30 nm thick and has a residual magnetic flux density of 0.7

T. The permanent magnet film 60 controls the occurrence of magnetic domain structures. After fabrication into a desired shape, the permanent magnet film 60 is covered with an electrode (Nb/Au/Nb laminate film) 70.

The fifth step (a5) is to remove the resist film, and then to sequentially deposit an insulating film ($Al_2O_3$) 80 for forming a magnetic gap, and an upper shield film (NiFe) 90. Finally, these layers are fabricated into a desired shape. In this way is obtained the desired magnetic head, having a height hMR of 0.18 μm.

The above-described procedure was repeated to prepare several magnetic heads in which the permanent magnetic film varied in thickness ($t_{PM}$)

Comparative Example 1

The same procedure as in Example 1 was repeated to prepare a conventional giant magnetoresistive head, except that the present procedure excludes the step of thinning the end regions of the free layer. This conventional giant magnetoresistive head is identical in Twr and hMR to the giant magnetoresistive head of Example 1.

The procedure was repeated to prepare several conventional magnetic heads in which the permanent magnetic film varied in thickness ($t_{PM}$).

The magnetic heads prepared in Example 1 and Comparative Example 1 were examined for transfer curve by applying a current of 3 mA. The results are shown in FIG. 8.

Figure 8:
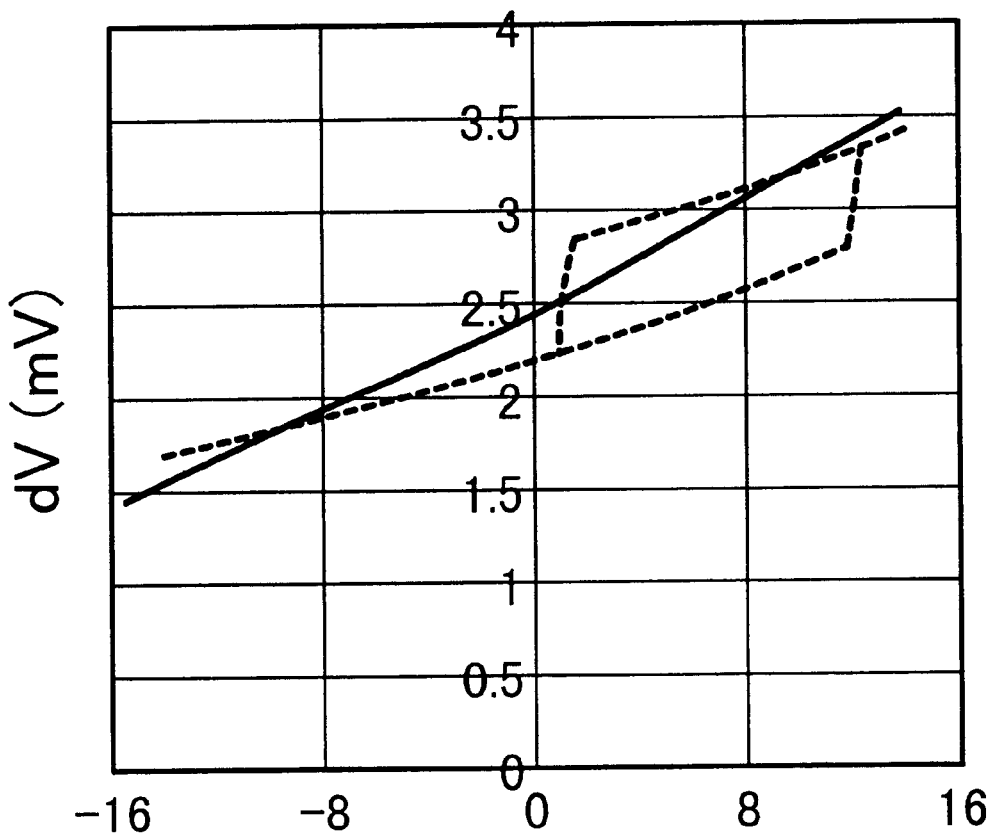
FIG. 8 is a transfer curve for characteristic properties.

It is noted from FIG. 8 that the sample in Example 1 works stably without hysteresis. By contrast, the sample in Comparative Example 1 has hysteresis and is liable to Barkhausen noise.

Then, the magnetic heads varying in $t_{PM}$ and the conventional magnetic heads varying in $t_{PM}$ were tested for read output and transfer curve. The results are shown in FIG. 9.

Figure 9:
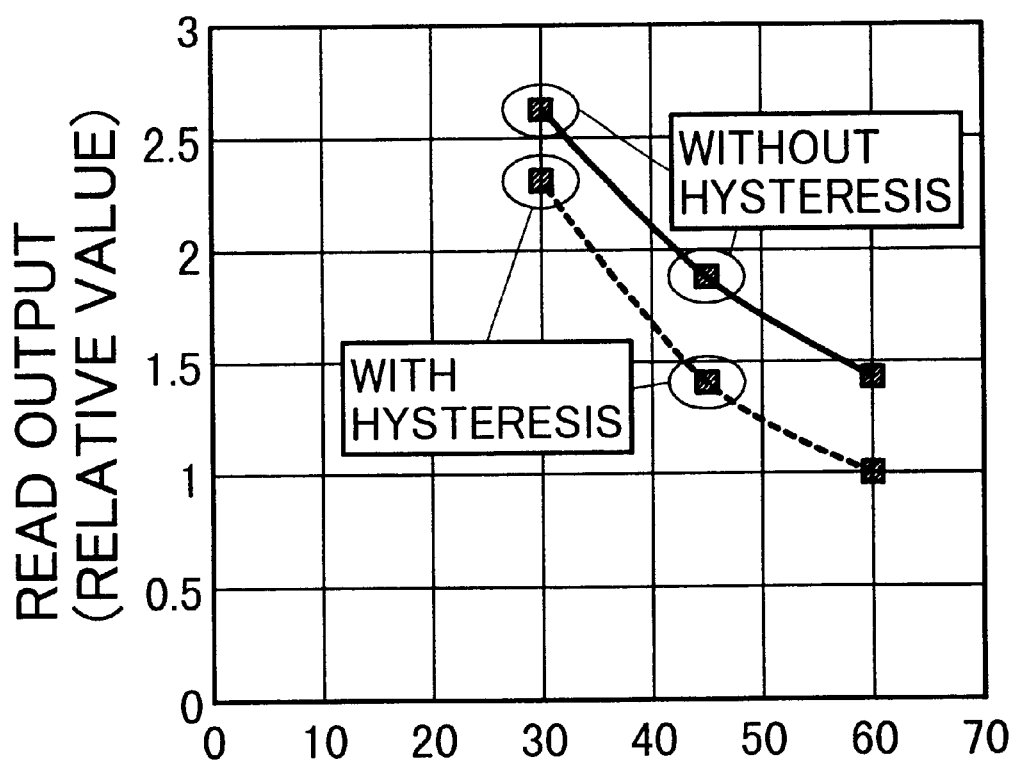
FIG. 9 is a characteristic curve showing the dependence of a read output on the thickness of the permanent magnet film.

It is noted from FIG. 9 that all the samples increase in read output with decreasing $t_{PM}$ (or with decreasing longitudinal bias field).

However, it is also noted that the conventional magnetic head has hysteresis in the transfer curve if its $t_{PM}$ is smaller than 60 nm. Therefore, the conventional magnetic head cannot have its $t_{PM}$ reduced beyond a certain limit.

By contrast, the magnetic head pertaining to the present invention is not subject to hysteresis even though it has its $t_{PM}$ reduced. It is noted that the magnetic head pertaining to the present invention which has a $t_{PM}$ of 30 nm produces a read output 2.5 times as large as that of the conventional magnetic head which has a $t_{PM}$ of 60 nm.

Further, according to the present invention, a giant magnetoresistive head with a high output free of Barkhausen noise can be obtained even though the free layer 35 of the GMR film 30 is replaced by a free layer of specular structure containing an oxide film.

Moreover, the above-mentioned order of forming the layers in production of the GMR film may be reversed. According to the reversed order, a free layer 35, a non-magnetic interlayer 40, a pinned layer 45, and an antiferromagnetic layer 50 are sequentially formed one on top of another.

Example 2

Figure 10:
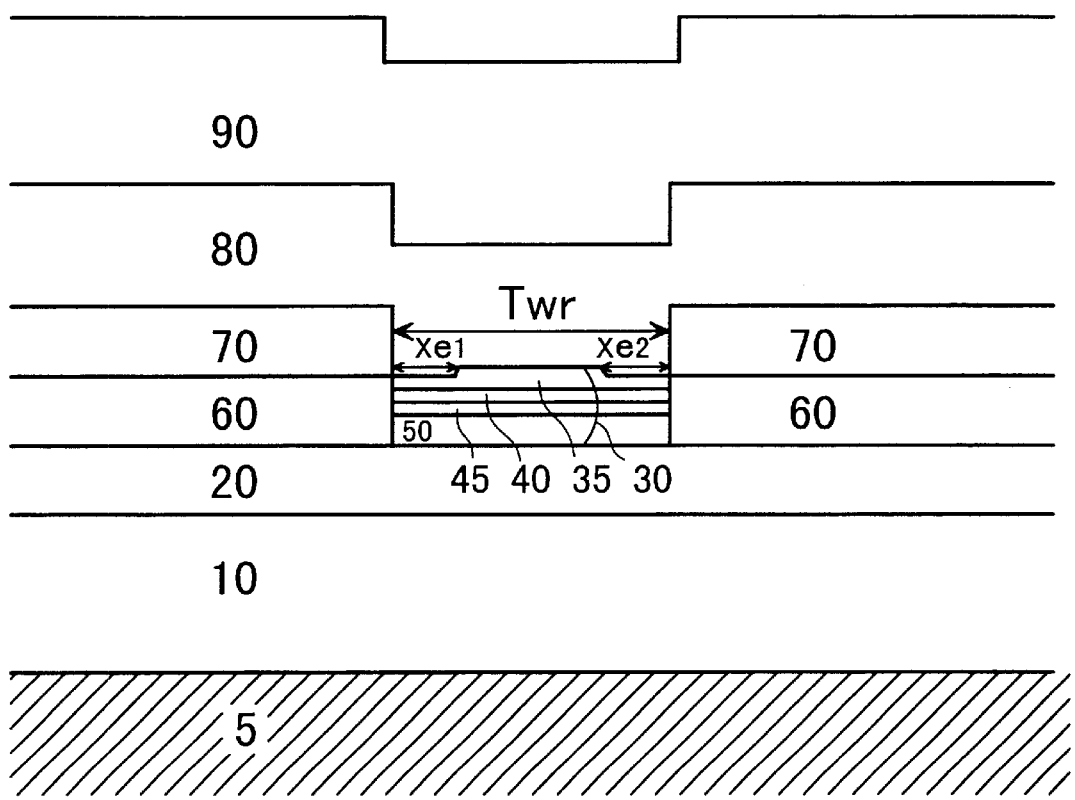
FIG. 10 is a sectional view of a magnetoresistive head in CIP mode.

A giant magnetoresistive (GMR) film 30, as shown in FIG. 10, was formed on a laminate composed of a substrate 5, a lower shield film (NiFe) 10, and an insulating film ($Al_2O_3$) 20 for forming a magnetic gap. The GMR film 30 was incorporated into a magnetic head with a giant magnetoresistive element in CIP mode.

The GMR film 30 was formed as follows by the process shown in FIGS. 6(b) and FIG. 7(b).

The first step (b1) is to sequentially deposit an antiferromagnetic layer (PtMn film) 50, a pinned layer (Co/Ru/Co laminate film) 45, a non-magnetic interlayer (Cu film) 40, and a free layer (NiFe/CoFe laminate film) 35 one on top of another.

The second step (b2) is to form an organic resist film 100 on the free layer 35 and perform ion milling on the free layer 35 through the resist film 100 as a mask, so that the free layer 35 is made thin except for its central part (corresponding to the track center).

The third step (b3) is to remove the organic resist film 100.

The fourth step (b4) is to form an organic resist film 105 again on the free layer. This organic resist film is larger (in the track width direction) than that previously formed.

The fifth step (b5) is to perform ion milling to pattern the GMR film 30 through the organic resist film 105 as a mask. Thus, a GMR film 30 is obtained in which Twr is 0.2 μm and Xe is 0.06 μm. The free layer has a thickness of 4 nm at its central part and a thickness of 1.8 nm at its end regions.

The sixth step (b6) is to form a permanent magnet film (CoCrPt) 60 which is contiguous to both ends of the GMR film mentioned above. This permanent magnet film 60 is 30 nm thick and has a residual magnetic flux density of 0.7 T. The permanent magnet film controls the occurrence of magnetic domain structures. After fabrication into a desired shape, the permanent magnet 60 is covered with an electrode (Nb/Au/Nb laminate film) 70.

The seventh step (b7) is to remove the resist film, and then to sequentially deposit an insulating film ($Al_2O_3$) 80 for forming a magnetic gap, and an upper shield film (NiFe) 90. Finally, these layers are fabricated into a desired shape. In this way is obtained the desired magnetic head, having a height hMR of 0.18 μm.

This procedure was repeated to prepare several magnetic heads with GMR films varying in Xe. All of the magnetic heads had a permanent magnet film whose $t_{PM}$ was 60 nm.

The thus-obtained magnetic heads (varying in Xe) were tested for read output and peak asymmetry of read output waveform (Asym). Asym is defined as $|V_+-V_-|/|V_++V_-|$, where $V_+$ is the peak value of the positive output and $V_-$ is the peak value of the negative output. Asym should preferably be as small as possible, and smaller than 10%. The results are shown in FIG. 11.

Figure 11:
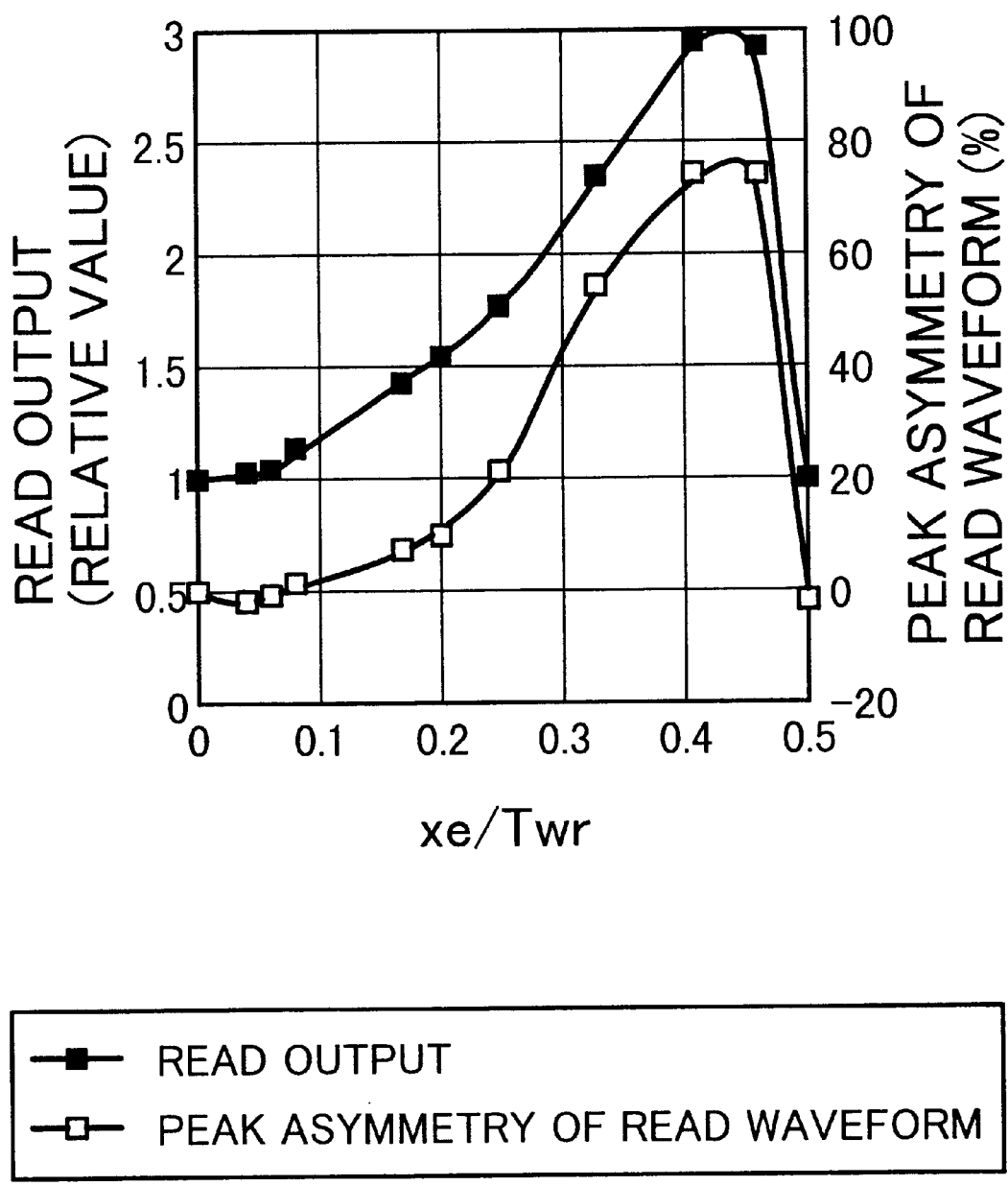
FIG. 11 is a graph showing the dependence of the read output and peak asymmetry of the read waveform on Xe/Twr.

FIG. 11 shows that the magnetic heads have good read output without hysteresis in the transfer curve if their ratio Xe/Twr is larger than 0 and smaller than 0.45. FIG. 11 also shows that the magnetic heads have good read output with a low value of Asym (smaller than 10%) if their ratio Xe/Twr is larger than 0.1 and smaller than 0.2.

Example 3

Figure 12A:
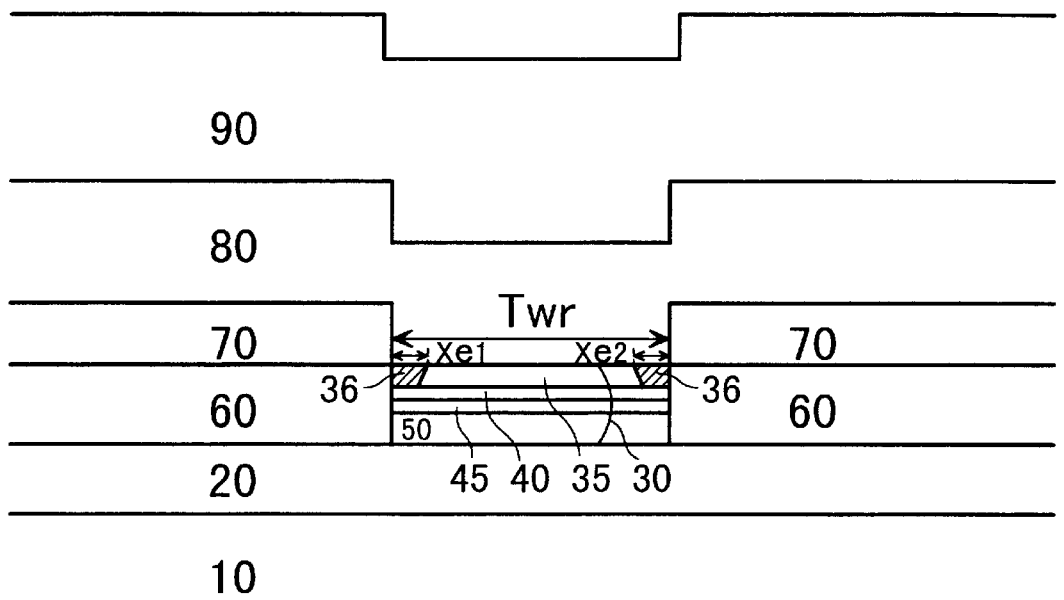
FIG. 12 is a sectional view of a magnetoresistive head in CIP mode.
Figure 12B:
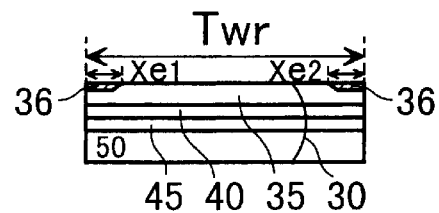

A giant magnetoresistive (GMR) film 30, as shown in FIG. 12, was formed on a laminate composed of a substrate 5, a lower shield film (NiFe) 10, and an insulating film ($Al_2O_3$) 20 for forming a magnetic gap. The GMR film was incorporated into a magnetic head with a giant magnetoresistive element in CIP mode.

The GMR film 30 was formed as follows by the process shown in FIG. 6(c).

The first step (c1) is to sequentially deposit an antiferromagnetic layer (PtMn film) 50, a pinned layer (Co/Ru/Co laminate film) 45, a non-magnetic interlayer (Cu film) 40, and a free layer (NiFe/CoFe laminate film) 35 one on top of another. This free layer is 4 nm thick and has a saturation magnetization of $1.3 \times 10^6$ A/m.

The second step (c2) is to form an organic resist film 100 on the free layer 35 and perform ion milling on the free layer 35 through the resist film 100 as a mask, so that the end regions of the free layer 35 are removed (except for the central part corresponding to the track center).

The third step (c3) is to deposit a ferromagnetic layer (NiFe) 36 on the end regions of the free layer which have been removed. This ferromagnetic layer is 4 nm thick and has a saturation magnetization of $0.8 \times 10^6$ A/m.

The fourth step (c4) is to remove the organic resist film 100.

The fifth step (c5) is to form an organic resist film again on the free layer. This organic resist film is larger (in the track width direction) than that previously formed.

The sixth step (c6) is to perform ion milling to pattern the GMR film 30 through the organic resist film as a mask. Thus, a GMR film 30 is obtained in which Twr is 0.2 μm and Xe is 0.034 μm.

The seventh step (c7) is to form a permanent magnet film (CoCrPt) 60 which is contiguous to both ends of the GMR film described above. This permanent magnet film 60 is 30 nm thick and has a residual magnetic flux density of 0.7 T. the permanent magnet film controls the occurrence of magnetic domain structures. After fabrication into a desired shape, the permanent magnet film is covered with an electrode (Nb/Au/Nb laminate film) 70.

The seventh step (b7) is to remove the resist film and to sequentially deposit an insulating film ($Al_2O_3$) 80 for forming a magnetic gap and an upper shield film (NiFe film) 90.

The eighth step (c8) is to remove the resist film, and then to deposit an insulating film ($Al_2O_3$) 80 for forming a magnetic gap, and an upper shield film (NiFe). Finally, these layers are fabricated into a desired shape. In this way is obtained the desired magnetic head, having a height hMR of 0.18 μm.

It was confirmed by the present inventors that the magnetic head obtained in Example 3 produces a high read output without Barkhausen noise.

The fact that the free layer is composed of different materials in its central part and its end regions is confirmed by EDX analysis (energy dispersion type X-ray analysis), which detects characteristic X-rays generated when the solid surface is irradiated with a concentrated thin electron beam.

Several samples of magnetoresistive film were prepared in which the end regions of the free layer 35 were not completely removed, but their thickness (t) was adjusted appropriately. The end regions were coated with a NiFe layer having a saturation magnetization of $0.8 \times 10^6$ A/m. These samples were incorporated into magnetic heads. The thus-obtained magnetic heads were tested for peak asymmetry of the read output waveform (Asym). The results are shown in FIG. 13.

Figure 13:
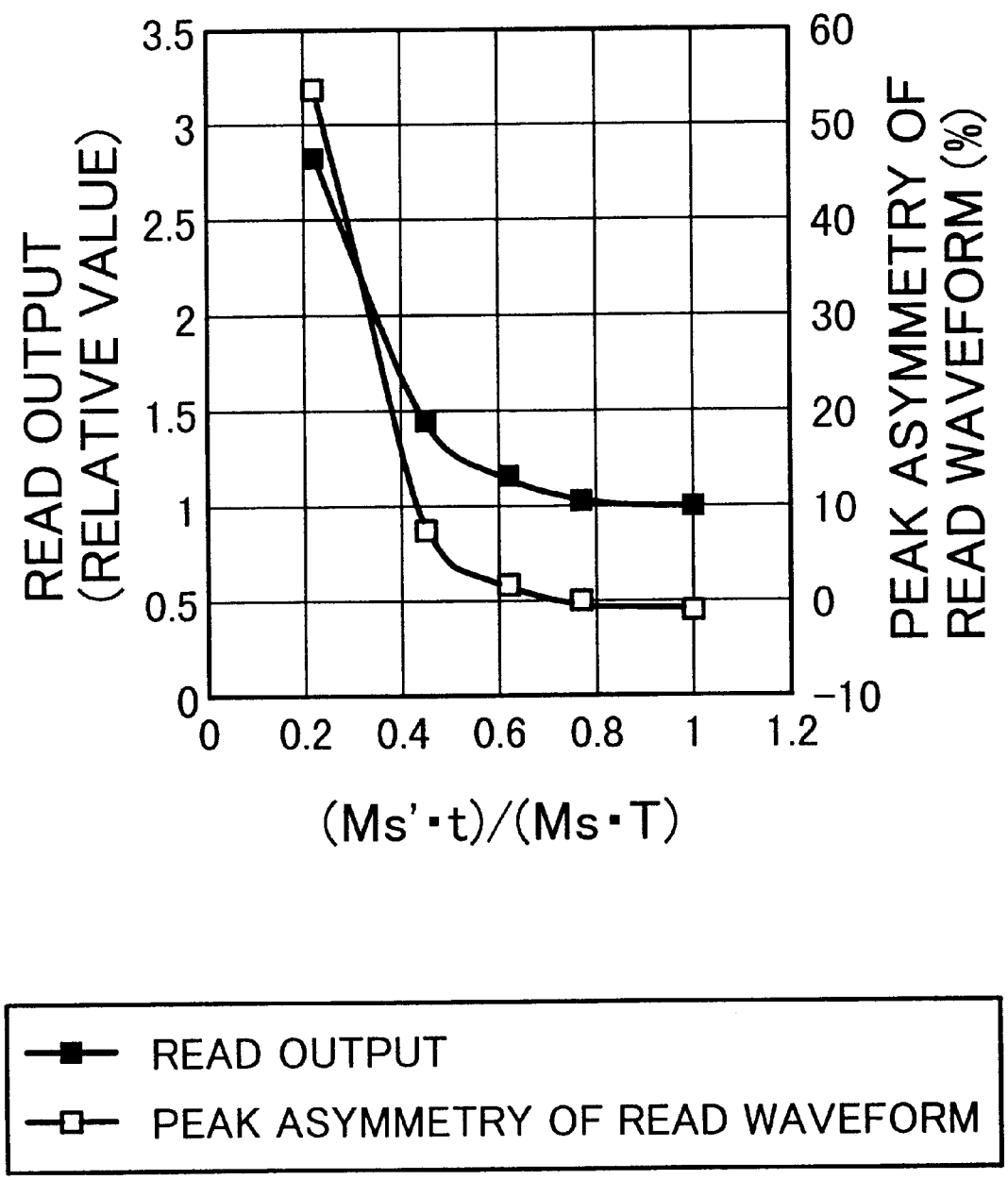
FIG. 13 is a graph showing the dependence of the read output and the peak asymmetry of the read waveform on $M_{s1}t_1/M_{s2}t_2$.

FIG. 13 shows that the magnetic heads have good read output with a low value of Asym (smaller than 10%) if the value of $M_s' \cdot t / M_s \cdot T$ is larger than 0.4 and smaller than 1, where T denotes the thickness of the free layer at its central part, $M_s$ denotes the saturation magnetization of the free layer in the central part (of thickness T), t denotes the thickness of the end region which is thinner than the central part, and $M_s'$ denotes the saturation magnetization of the free layer in the end region (of thickness t).

Example 4

Figure 14:
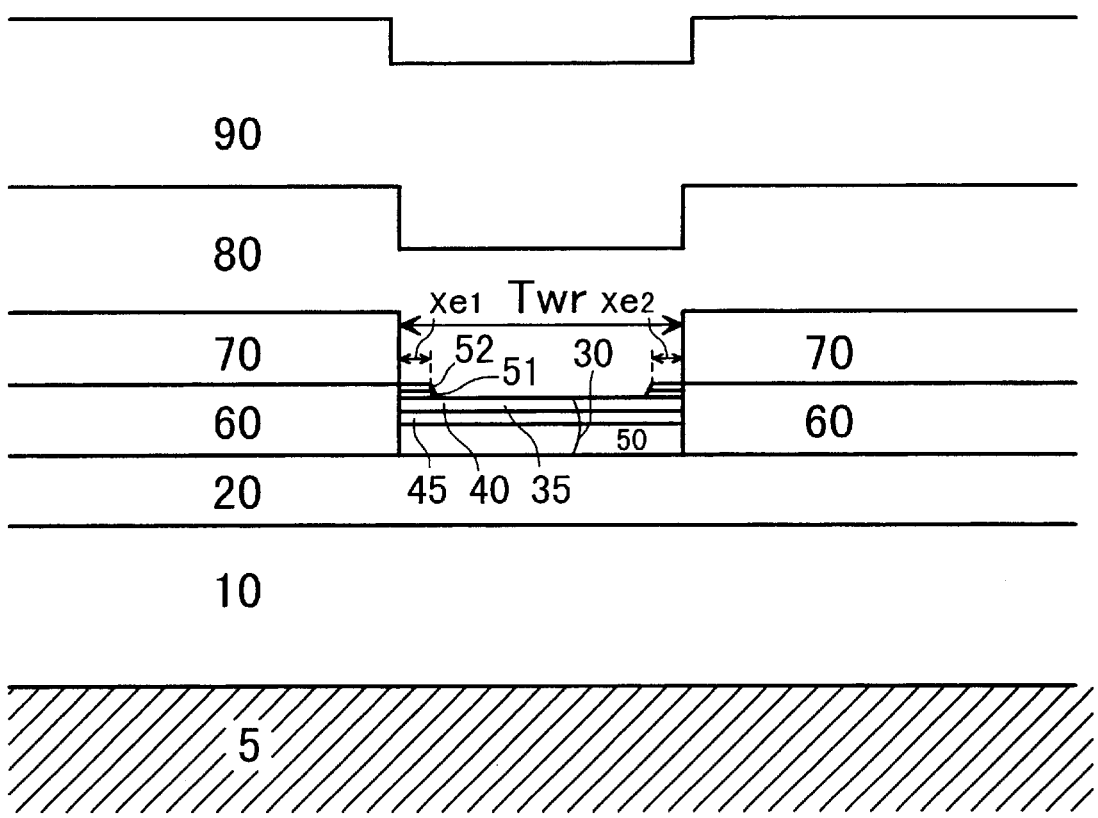
FIG. 14 is a sectional view of a magnetoresistive head in CIP mode.

A giant magnetoresistive (GMR) film 30, as shown in FIG. 14, was formed on a laminate composed of a substrate 5, a lower shield film (NiFe) 10, and an insulating film ($Al_2O_3$) 20 for forming a magnetic gap. The GMR film 30 was incorporated into a magnetic head with a giant magnetoresistive element in CIP mode.

The GMR film 30 was formed as follows by the process shown in FIG. 6(d).

The first step (d1) is to sequentially deposit an antiferromagnetic layer (PtMn film) 50, a pinned layer (Co/Ru/Co laminate film) 45, a non-magnetic interlayer (Cu film) 40, and a free layer (NiFe/CoFe laminate film) 35 one on top of another. This free layer is 4 nm thick and has a saturation magnetization of $1.3 \times 10^6$ A/m.

The second step (d2) is to form an organic resist film on the central part of the free layer.

The third step (d3) is to deposit a Ru film 51 (0.8 nm thick) and a NiFe film 52 (1.6 nm thick) on the end regions of the free layer (where the organic resist film is not present). That part of the free layer 35 which has no resist film has practically a net saturation magnetization as small as $0.8 \times 10^6$ A/m. This is because the resist-free part of the free layer and the NiFe layer 52 are connected together by strong antiferromagnetic bonding.

The fourth step (d4) is to remove the organic resist film.

The fifth step (d5) is to form an organic resist film again on the free layer. This organic resist film is larger (in the track width direction) than that previously formed.

The sixth step (d6) is to perform ion milling to pattern the GMR film through the organic resist film as a mask. Thus, a GMR film 30 is obtained in which Twr is 0.2 μm and Xe is 0.034 μm, wherein Xe denotes the length of the region in which the net saturation magnetization is small.

The seventh step (d7) is to form a permanent magnet film (CoCrPt) 60 which is contiguous to both ends of the GMR film described above. This permanent magnet film 60 is 30 nm thick and has a residual magnetic flux density of 0.7 T. The permanent magnet film controls the occurrence of magnetic domain structures. After fabrication into a desired shape, the permanent magnet film is covered with an electrode (Nb/Au/Nb laminate film) 70.

The eighth step (d8) is to remove the resist film, and then to deposit an insulating film ($Al_2O_3$) 80 for forming a magnetic gap, and an upper shield film (NiFe) 90. Finally, these layers are fabricated into a desired shape. In this way is obtained the desired magnetic head, having a height hMR of 0.18 μm.

It was confirmed that the magnetic head obtained in Example 4 produces a high read output with very little Barkhausen noise.

Example 5

Figure 15:
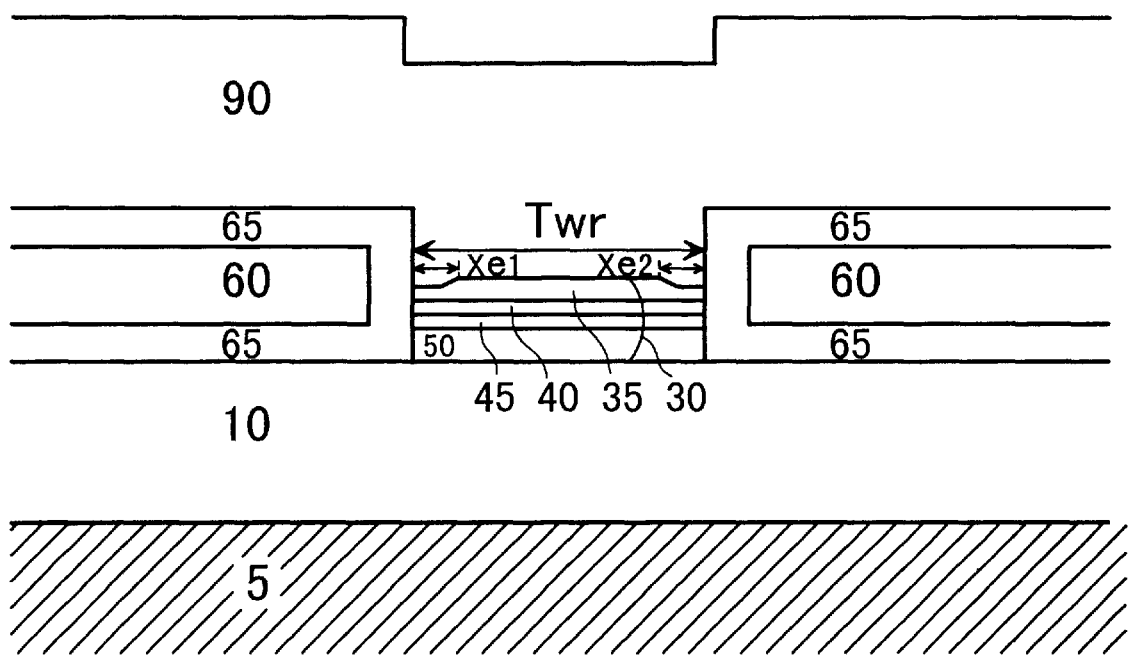
FIG. 15 is a sectional view of a magnetoresistive head in CPP mode.
Figure 16:
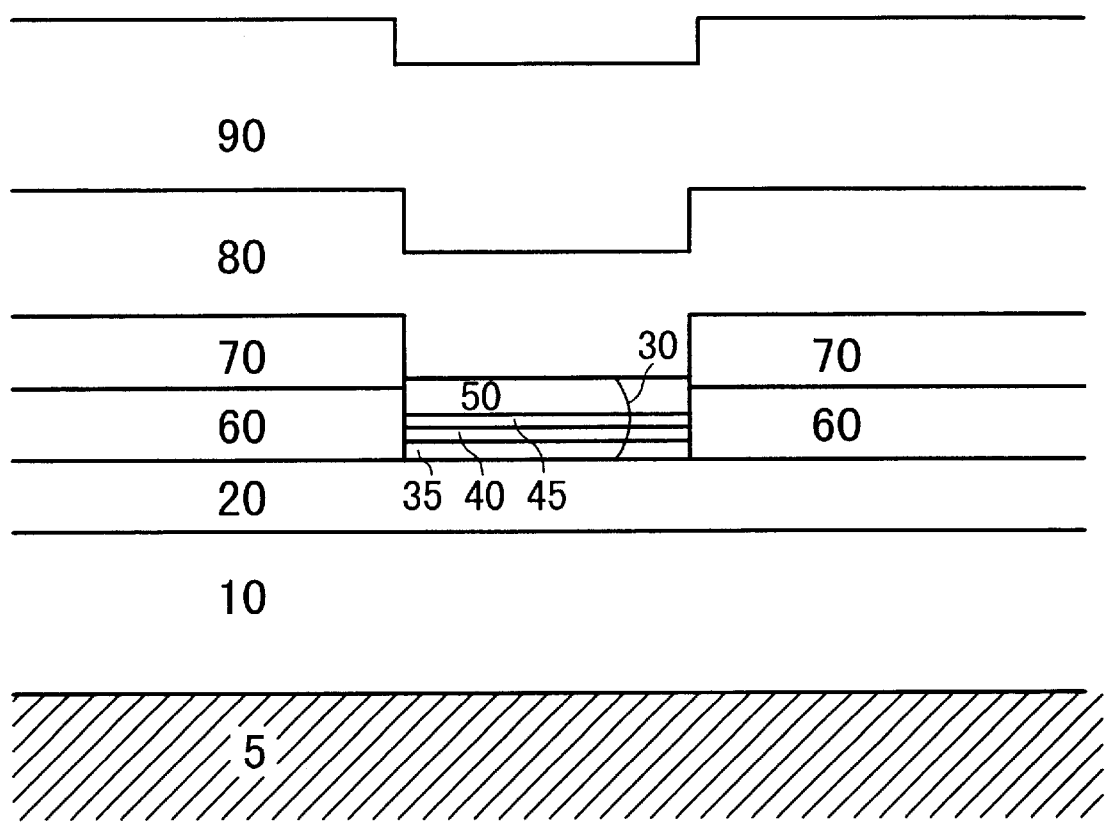
FIG. 16 is a sectional view showing a conventional giant magnetoresistive head in CIP mode.
Figure 17:
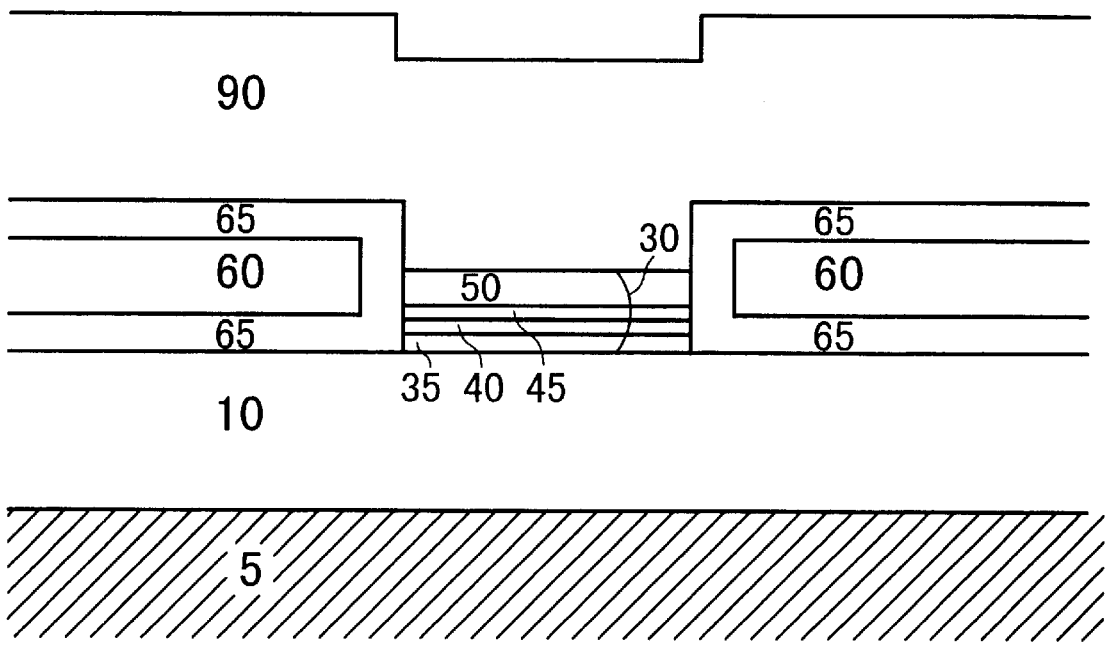
FIG. 17 is a sectional view showing a conventional giant magnetoresistive head in CPP mode.
Figure 18:
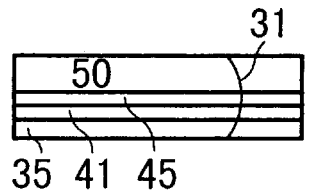
FIG. 18 is a sectional view showing a conventional tunnel magnetoresistive head.
Figure 19:
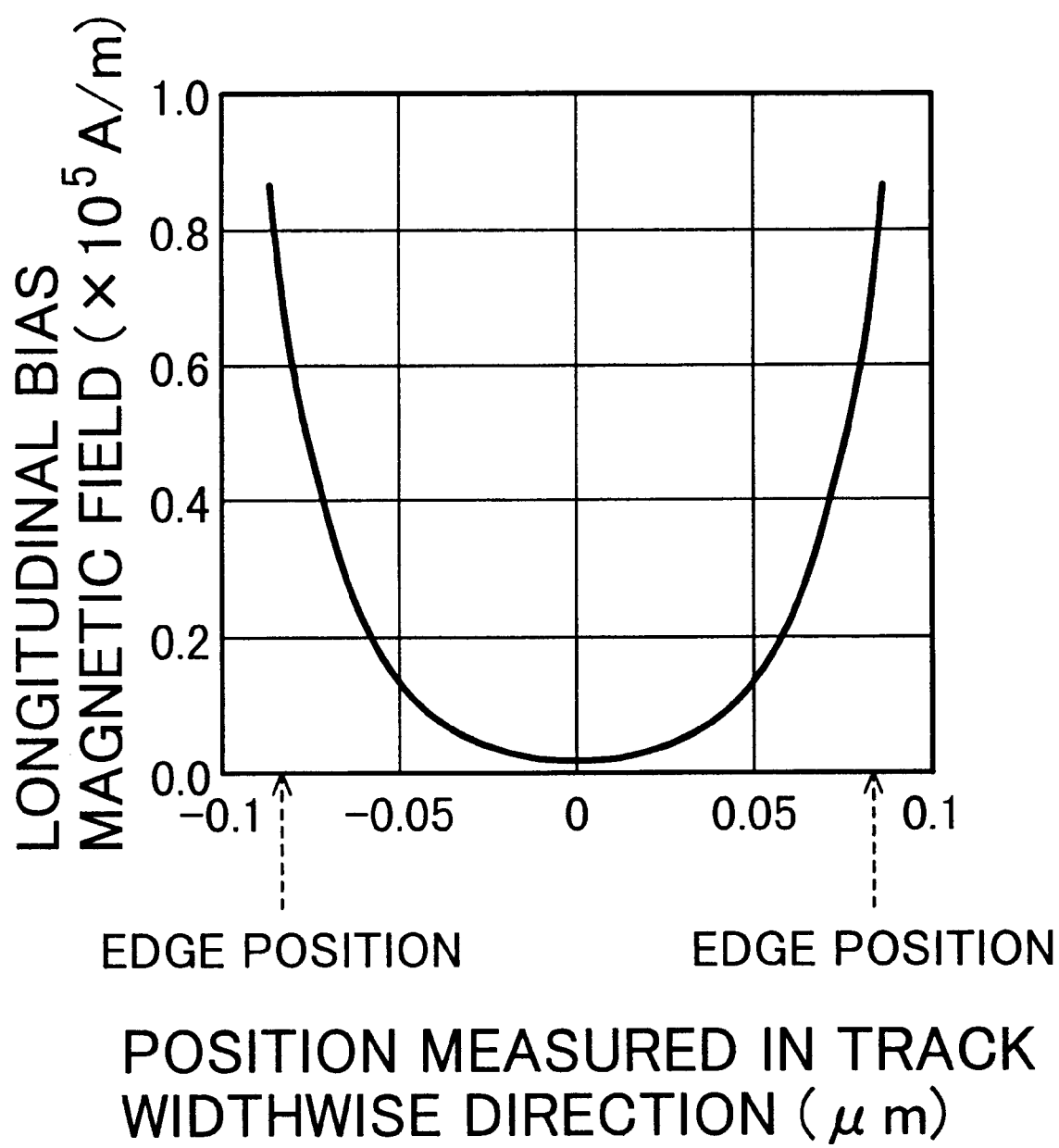
FIG. 19 is a diagram showing the distribution of longitudinal bias field in the track width direction.

A giant magnetoresistive (GMR) film 30, as shown in FIG. 15, was formed on a laminate composed of a substrate 5 and a lower magnetic shield film 10, which functions also as a lower electrode film (NiFe film). The GMR film was incorporated into a magnetic head with a giant magnetoresistive element in CPP mode.

Figure 6A:
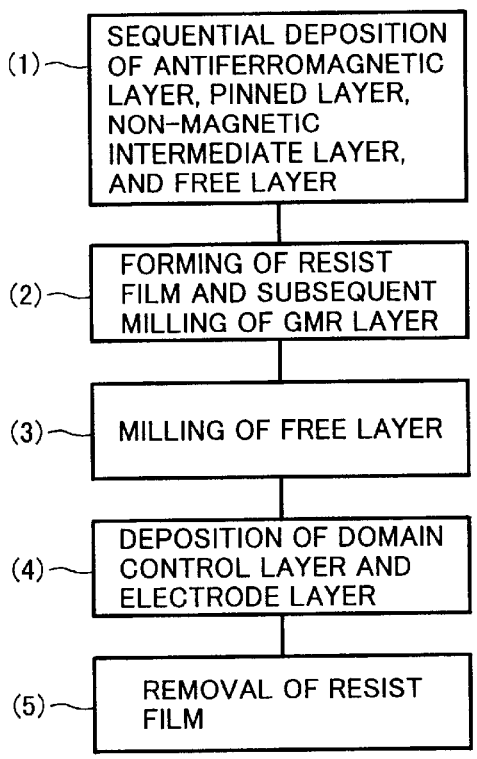
FIG. 6 is a flowchart showing the process for producing a giant magnetoresistive film constructed according to the teachings of the present invention.
Figure 6B:
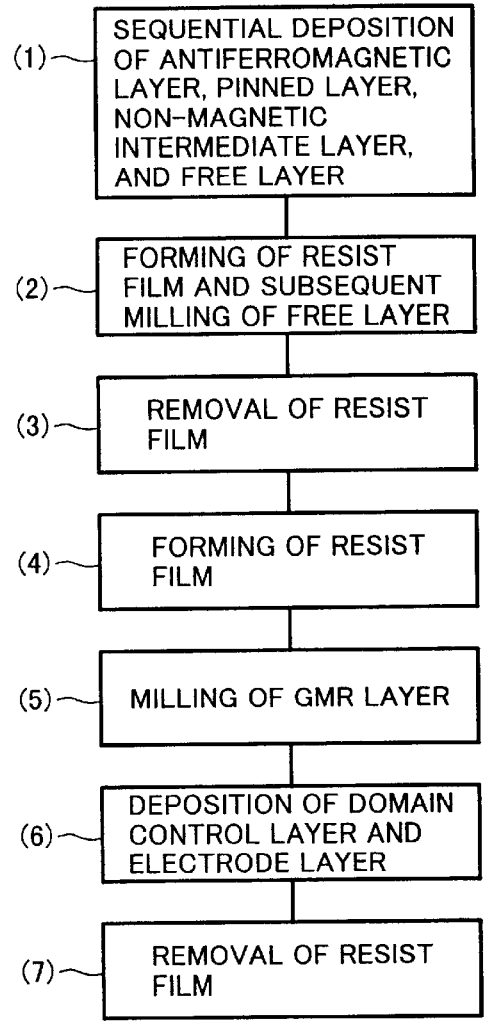
Figure 6C:
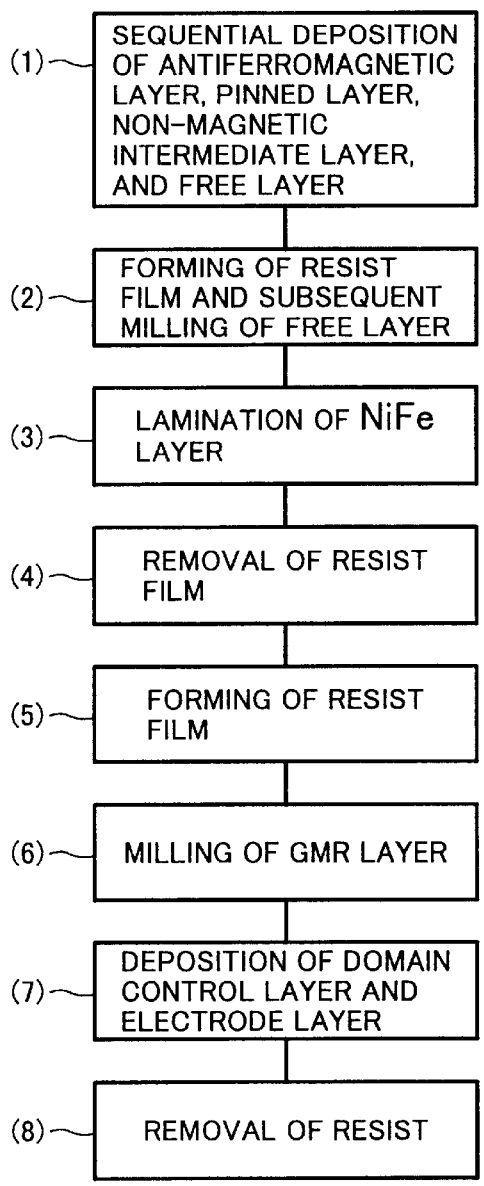
Figure 6D:
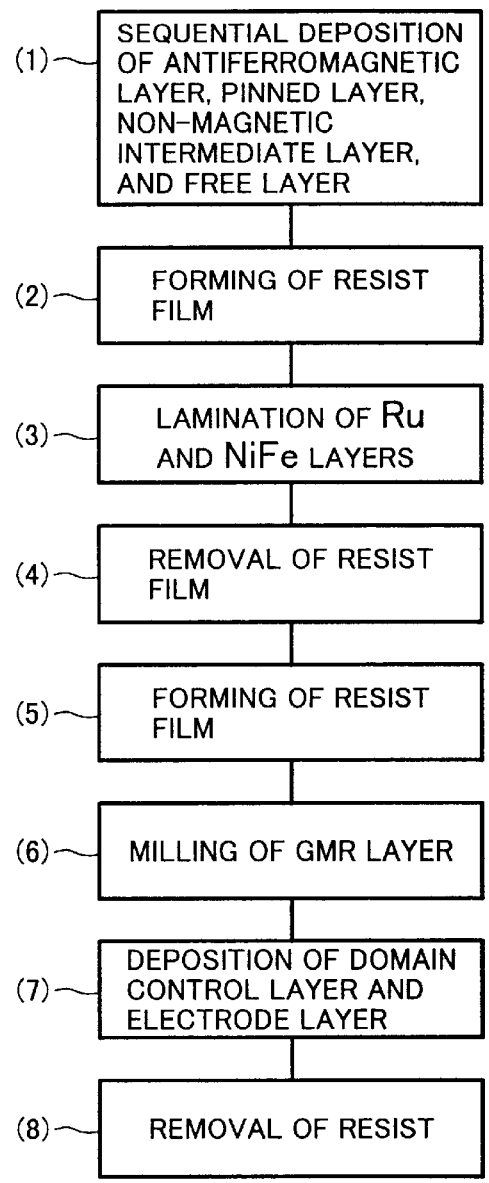

The GMR film 30 was formed by the same process shown in FIG. 6(a) in Example 1, except that Twr was changed to 0.1 μm and Xe was changed to 0.015 μm.

The GMR film was held between films to control magnetic domain structures which are contiguous to both ends of the GMR film. Each of these films is a laminate (30 nm thick) composed of upper and lower insulating films (Al$_2$O$_3$) 65 and a permanent magnet film (CoCrPt) 60 interposed between them. This permanent magnet film 60 has a residual magnetic flux density of 0.7 T. After fabrication into a desired shape, the permanent magnet film 60 is covered with an upper magnetic shield layer 90 which functions also as an upper electrode (Nb/Au/Nb laminate film). In this way is obtained the desired magnetic head, having a height hMR of 0.1 μm.

It was confirmed that the magnetic head obtained in Example 5 produces a high read output without Barkhausen noise, despite its narrower track width than in Example 1.

Example 6

A magnetic head of tunnel magnetoresistance effect was prepared which was composed of a lower magnetic shield film, which functions also as a lower electrode film (NiFe film), and a tunnel magnetoresistive film (TMR film).

The TMR film is formed as follows. First, on the substrate are sequentially deposited an antiferromagnetic layer (PtMn film), a pinned layer (Co/Ru/Co laminate film), a tunnel barrier layer, and a free layer (NiFe/CoFe laminate film).

Second, an organic resist film is formed.

Third, the TMR film is patterned by ion milling, so that Twr is 0.12 μm.

Fourth, ion milling is performed at different incident angles on the end regions of the free layer such that the end regions of the free layer become thinner than the central part of the free layer. The thinner end regions each have a length (Xe) of 0.018 μm, so that the requirement of $0.9 \leq Xe/Twr \leq 0.2$ is met. The thickness of the central part of the free layer is 4 nm and the thickness of the end regions of the free layer is 1.8 nm.

The thus obtained TMR film was held between films to control magnetic domain structures which are contiguous to both ends of the TMR film. Each of these films is a laminate (30 nm thick) composed of upper and lower insulating films (Al$_2$O$_3$) and a permanent magnet film (CoCrPt) interposed between them. This permanent magnet film has a residual magnetic flux density of 0.7 T. After fabrication into a desired shape, the permanent magnet film is covered with an upper magnetic shield layer which functions also as an upper electrode (NiFe film). In this way is obtained the desired magnetic head, having a height hMR of 0.1 μm.

It was confirmed that the magnetic head obtained in Example 6 produces a high read output without Barkhausen noise, despite its narrower track width than in Example 1.

The present invention covers the following additional embodiments.

(1) A magnetic recording apparatus which comprises a magnetic recording medium, a magnetoresistive head composed of an upper shield, a lower shield, a magnetoresistive element held between said upper and lower shields, and a magnetic domain controlling film placed at both ends of the magnetoresistive element, a magnetic head drive unit to drive the magnetic head, a magnetic recording medium drive unit to drive the magnetic recording medium, and a read signal processing system to process signals reproduced by the magnetic head from the magnetic recording medium, wherein the magnetoresistive element is composed of an antiferromagnetic layer, a second magnetic layer, a non-magnetic interlayer, and a first magnetic layer which are sequentially formed one on top of another, with the first magnetic layer being formed such that regions at both ends thereof, through which the track width extends, are thinner than its central part, through which the track width extends, and the thin regions have a specific width Xe defined by the equation $0.08 \leq Xe/Twr \leq 0.2$, where Twr denotes the track width.

(2) A magnetic recording apparatus as mentioned in (1) above, wherein the magnetoresistive element satisfies the equation $0.4 < M_s' \cdot t/M_s \cdot T < 1$, where T denotes the thickness of the free layer at its central part, through which the track width extends, $M_s$ denotes the saturation magnetization of the free layer in the central region (of thickness T), t denotes the thickness of each of the end regions, which is thinner than the central part, and $M_s'$ denotes the saturation magnetization of the free layer in each region (of thickness t).

(3) A magnetic recording apparatus as mentioned in (1) above, wherein the first magnetic layer contains more than one material differing in saturation magnetization.

(4) A magnetic recording apparatus which comprises a magnetic recording medium, a magnetoresistive head composed of an upper shield, a lower shield, a magnetoresistive element held between said upper and lower shields, and a magnetic domain controlling film placed at both ends of the magnetoresistive element, a magnetic head drive unit to drive the magnetic head, a magnetic recording medium drive unit to drive the magnetic recording medium, and a read signal processing system to process signals reproduced by the magnetic head from the magnetic recording medium, wherein the magnetoresistive element is composed of an antiferromagnetic layer, a second magnetic layer, a non-magnetic interlayer, and a first magnetic layer which are sequentially formed one on top of another, with the first magnetic layer being formed such that regions at both ends thereof, through which the track width extends, have a smaller saturation magnetization than its central part, through which the track width extends, and the thin regions have a specific width Xe defined by the equation $0.08 \leq Xe/Twr \leq 0.2$, where Twr denotes the track width.

(5) A magnetic recording apparatus as mentioned in (4) above, wherein the magnetoresistive element satisfies the equation $0.4 < M_s' \cdot t/M_s \cdot T < 1$, where $M_s$ denotes the saturation magnetization of the central part of the first magnetic layer, through which the track width extends, T denotes the thickness of the first free layer in the central part (where the saturation magnetization is Ms), $M_s'$ denotes the saturation magnetization in the end region of the first magnetic layer where the saturation magnetization is smaller than that in the central part, and t denotes the thickness of the end region of the first magnetic layer (in which the saturation magnetization is $M_s'$).

(6) A magnetic recording apparatus as mentioned in (4) above, wherein the first magnetic layer contains more than one material differing in saturation magnetization.

(7) A process for producing a magnetoresistive head which comprises a step of sequentially depositing an antiferromagnetic layer, a second magnetic layer, a non-magnetic interlayer, and a first magnetic layer one on top of another, a step of forming a resist pattern on the first magnetic layer, a step of performing ion milling through the resist pattern as a mask at a first incident angle, a step of forming a magnetic domain controlling film at both ends of the magnetoresistive film, a step of forming an electrode to make electrical contact with the magnetoresistive film, and a step of removing the resist pattern.

(8) A process for producing a magnetoresistive head which comprises a step of sequentially depositing an antiferromagnetic layer, a second magnetic layer, a non-magnetic interlayer, and a first magnetic layer one on top of another, a step of forming a first resist pattern on the first magnetic layer, a step of performing ion milling through the first resist pattern as a mask, a step of removing the first resist pattern, a step of forming a second resist pattern which is wider (in the direction of track width) than the first resist pattern, a step of performing ion milling on the magnetoresistive film through the second resist pattern as a mask, a step of forming a magnetic domain controlling film at both ends of the magnetoresistive film, a step of forming an electrode to make electrical contact with the magnetoresistive film, and a step of removing the second resist pattern.

(9) A process for producing a magnetoresistive head which comprises a step of sequentially depositing an antiferromagnetic layer, a second magnetic layer, a non-magnetic interlayer, and a first magnetic layer one on top of another, a step of forming a first resist pattern on end parts of the first magnetic layer (through which the track width extends), a step of placing at both ends of the first magnetic layer a ferromagnetic film having a smaller saturation magnetization than the first magnetic layer, a step of removing the first resist pattern, a step of forming a second resist pattern which is wider (in the direction of track width) than the first resist pattern, a step of performing ion milling on the magnetoresistive film through the second resist pattern as a mask, a step of forming a magnetic domain controlling film at both ends of the magnetoresistive film, a step of forming an electrode to make electrical contact with the magnetoresistive film, and a step of removing the second resist pattern.

(10) A process for producing a magnetoresistive head which comprises a step of sequentially depositing an antiferromagnetic layer, a second magnetic layer, a non-magnetic interlayer, and a first magnetic layer one on top of another, a step of forming a first resist pattern on the central part of the first magnetic layer, a step of depositing an intermediate layer and ferromagnetic layer on the end regions of the first magnetic layer on which the first resist pattern is not formed, a step of removing the resist pattern, a step of forming a second resist pattern which is wider (in the direction of track width) than the first resist pattern, a step of performing ion milling at a prescribed incident angle on the magnetoresistive film through the second resist pattern as a mask, a step of forming a magnetic domain controlling film at both ends of the magnetoresistive film, a step of forming an electrode to make electrical contact with the magnetoresistive film, and a step of removing the second resist pattern.

As discussed above, the present invention provides a magnetoresistive element having a high read output with very little Barkhausen noise, and also provides a magnetoresistive head equipped with the magnetoresistive element. Moreover, the present invention provides a magnetic recording apparatus combined with a recording medium capable of ultra-high-density recording of 100 Gbit/in$^2$.

The invention may be embodied in other specific forms without departing from the spirit or essential characteristics thereof. The disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A magnetoresistive element, comprising:

an antiferromagnetic layer;

a second magnetic layer on the antiferromagnetic layer;

a non-magnetic interlayer on the second magnetic layer; and a first magnetic layer on the non-magnetic interlayer;

wherein said first magnetic layer extends in a track width direction, and includes at least one specific region at an end of the first magnetic layer in the track width direction, a thickness of the first magnetic layer at said at least one specific region being thinner than that at a central part of said first magnetic layer in the track width direction; and each of said specific regions has a width Xe defined by the equation $0.08 \leq Xe/Twr \leq 0.2$, where Twr denotes the track width of the first magnetic layer.

2. A magnetoresistive element according to claim 1, wherein an equation $0.4 < M_s' \cdot t / M_s \cdot T < 1$ is satisfied, where T denotes the thickness of said first magnetic layer at the central part in the track width direction, $M_s$ denotes the saturation magnetization of said first magnetic layer at which its thickness is T, t denotes an average thickness of each of said at least one specific region, and $M_s'$ denotes the saturation magnetization of the first magnetic layer at each said specific region.

3. A magnetoresistive element according to claim 1, wherein said first magnetic layer comprises a plurality of materials differing in saturation magnetization.

4. A magnetoresistive element, comprising:

an antiferromagnetic layer;

a second magnetic layer on the antiferromagnetic layer;

a non-magnetic interlayer on the second magnetic layer; and a first magnetic layer on the non-magnetic interlayer;

wherein said first magnetic layer extends in a track width direction, and includes a specific region at each end of the first magnetic layer in the track width direction;

the saturation magnetization of each said specific region is smaller than that at a central part of said first magnetic layer, and each of said specific regions has a width Xe defined by the equation $0.08 \leq Xe/Twr \leq 0.2$, where Twr denotes the track width of the first magnetic layer.

5. A magnetoresistive element according to claim 4, wherein an equation $0.4 < M_s' \cdot t / M_s \cdot T < 1$ is satisfied, where T denotes the thickness of said first magnetic layer at its central part in the track width direction, $M_s$ denotes the saturation magnetization of said first magnetic layer at which its thickness is T, t denotes an average thickness of each said specific region, and $M_s'$ denotes the saturation magnetization of the first magnetic layer at each said specific region.

6. A magnetoresistive element according to claim 4, wherein the first magnetic layer contains more than one material differing in saturation magnetization.

7. A magnetoresistive head, comprising:

an upper shield;

a lower shield;

a magnetoresistive element provided between said upper and lower shields; and a magnetic domain controlling film provided at both ends of the magnetoresistive element in a track width direction of said magnetoresistive element;

wherein said magnetoresistive element comprises an antiferromagnetic layer, a second magnetic layer on the antiferromagnetic layer, a non-magnetic interlayer on the second magnetic layer, and a first magnetic layer on the non-magnetic interlayer;

wherein said first magnetic layer includes a specific region at each end thereof in the track width direction;

the first magnetic film has a thickness at each said specific region that is thinner than that at a central part of said first magnetic layer; and each said specific region has a width Xe defined by the equation $0.08 \leq Xe/Twr \leq 0.2$, where Twr denotes the track width of the first magnetic layer.

8. A magnetoresistive head according to claim 7, wherein an equation $0.4 < M_s' \cdot t / M_s \cdot T < 1$ is satisfied, where T denotes the thickness of said first magnetic layer at its central part in the track width direction, $M_s$ denotes the saturation magnetization of said first magnetic layer at which its thickness is T, t denotes an average thickness of each said specific region, and $M_s'$ denotes the saturation magnetization of the first magnetic layer at each said specific region.

9. A magnetoresistive head according to claim 7, wherein said first magnetic layer comprises a plurality of materials differing in saturation magnetization.

10. A magnetoresistive head, comprising:

an upper shield;

a lower shield;

a magnetoresistive element provided between said upper and lower shields; and a magnetic domain controlling film provided at each end of the magnetoresistive element in a track width direction of said magnetoresistive element;

wherein said magnetoresistive element comprises an antiferromagnetic layer, a second magnetic layer on the antiferromagnetic layer, a non-magnetic interlayer on the second magnetic layer, and a first magnetic layer on the non-magnetic interlayer;

said first magnetic layer includes a specific region at each end of the first magnetic layer in the track width direction;

the saturation magnetization of said specific region is smaller than that at a central part of said first magnetic layer, and said specific region has a width Xe defined by the equation $0.08 \leq Xe/Twr \leq 0.2$, where Twr denotes the track width of the first magnetic layer.

11. A magnetoresistive head according to claim 10, wherein an equation $0.4 < M_s' \cdot t / M_s \cdot T < 1$ is satisfied, where T denotes the thickness of said first magnetic layer at its central part in the track width direction, $M_s$ denotes the saturation magnetization of said first magnetic layer at which its thickness is T, t denotes an average thickness of said specific region, and $M_s'$ denotes the saturation magnetization of the first magnetic layer at said specific region.

12. A magnetoresistive head according to claim 10, wherein said first magnetic layer comprises a plurality of materials differing in saturation magnetization.

* * * * *